US010443808B1

(12) United States Patent
Heib et al.

(10) Patent No.: US 10,443,808 B1
(45) Date of Patent: Oct. 15, 2019

(54) VEHICULAR COMPONENTS HAVING CHROMIUM-BASED REFLECTIVE COATING AT LEAST PARTIALLY PERMEABLE TO LIGHT

(71) Applicant: Motherson Innovations Company Ltd., London (GB)

(72) Inventors: Sascha Björn Heib, Morphett Vale (AU); Simon David Field, Flagstaff Hill (AU)

(73) Assignee: Motherson Innovations Company Ltd., London (GB)

( * ) Notice: Subject to any disclaimer, the term of this patent is extended or adjusted under 35 U.S.C. 154(b) by 0 days.

(21) Appl. No.: 16/378,533

(22) Filed: Apr. 8, 2019

Related U.S. Application Data

(60) Provisional application No. 62/642,010, filed on Mar. 13, 2018.

(51) Int. Cl.
*F21V 1/00* (2006.01)
*F21S 43/33* (2018.01)
*B60Q 1/26* (2006.01)

(52) U.S. Cl.
CPC ............ *F21S 43/33* (2018.01); *B60Q 1/2607* (2013.01)

(58) Field of Classification Search
CPC ...... B60Q 1/2607; F21S 41/20; F21S 41/275; F21S 41/285; F21S 43/20; F21S 43/26; F21S 43/33
USPC .......................... 362/509, 520–522, 538–545
See application file for complete search history.

(56) References Cited

U.S. PATENT DOCUMENTS

| | | | |
|---|---|---|---|
| 9,176,256 | B2 | 11/2015 | Hall et al. |
| 9,181,616 | B2 | 11/2015 | Evans et al. |
| 9,656,601 | B2 | 5/2017 | Evans et al. |
| 9,819,343 | B2 | 11/2017 | Koehne et al. |
| 2017/0267179 | A1 | 9/2017 | Herrmann et al. |

*Primary Examiner* — Jason M Han

(57) ABSTRACT

A lamp assembly configured to be mounted to a vehicle includes a housing configured to be coupled to a vehicle and at least one light source disposed at least partially within an interior of the housing. The lamp assembly further includes a transparent polymeric lens coupled to the housing so as to substantially enclose the interior of the housing and the at least one light source. The transparent polymeric lens has a chromium-based reflective coating coated on at least a first area of an outer surface thereof. With the at least one light source electrically-connected to the vehicle, the chromium-based reflective coating is at least partially permeable to at least some light which is emitted by the at least one light source and passed through the transparent polymeric lens. At least a second area of the outer surface of the transparent polymeric lens is devoid of the chromium-based reflective coating.

29 Claims, 12 Drawing Sheets

VEHICULAR COMPONENTS HAVING CHROMIUM-BASED REFLECTIVE COATING AT LEAST PARTIALLY PERMEABLE TO LIGHT

CROSS-REFERENCE TO RELATED APPLICATIONS

The present application claims the benefit of priority to U.S. Provisional Patent Application No. 62/642,010, filed Mar. 13, 2018, which is hereby incorporated by reference in its entirety for all purposes.

TECHNICAL FIELD

The present disclosure relates generally to vehicular lighting and, more particularly, to vehicular components including at least one light source, the vehicular components having a chromium-based reflective coating coated thereon which is at least partially permeable to at least some light emitted by the at least one light source.

BACKGROUND

Vehicles, such as passenger cars, vans and trucks, often include various interior and exterior vehicular lighting components capable of emitting light for various purposes. Additionally, such aforementioned vehicles often include various interior and exterior vehicular components having a metallic reflective coating coated thereon exhibiting a chrome or mirror-like surface finish.

As vehicle manufacturers continue to seek ways to enhance overall vehicle lighting functionality and vehicle design, it is often challenging to aesthetically harmonize and/or merge the appearance of various vehicular lighting components with other surrounding vehicular components mounted to a vehicle, such as the aforementioned vehicular components having a metallic reflective coating coated thereon exhibiting a chrome or mirror-like surface finish. For example, due to at least respective differences in exterior geometries, materials, exterior surface finishes, packaging and other factors, it is often challenging to aesthetically harmonize and/or merge the appearance of various headlamps, tail lamps, turn signal lights, daytime running lights, reverse lights and other vehicular lighting components with other surrounding vehicular components mounted to a vehicle, such as exterior trim pieces, grills, bumpers and other vehicular components having a metallic reflective coating coated thereon exhibiting a chrome or mirror-like surface finish.

Additionally, reducing the overall number of visible vehicular lighting components mounted to a vehicle, such as on bumpers or other vehicular components, may be desired by some vehicle manufacturers to provide the vehicle with a sleeker, more elegant appearance. However, reducing the overall number of visible vehicular lighting components mounted to a vehicle is often challenging because various vehicular lighting components may need to remain in order to satisfy various lighting and/or safety regulations for various jurisdictions where the vehicle is to be driven.

With at least the aforementioned challenges and limitations in mind, there is a continuing unaddressed need for vehicular components, particularly vehicular lighting components, which are capable of emitting sufficient amounts of light to effectively perform their intended purpose, yet are capable of having an appearance which aesthetically harmonizes and/or merges with other surrounding vehicular components mounted to a vehicle, particularly vehicular components which have a metallic reflective coating coated thereon exhibiting a chrome or mirror-like surface finish. Additionally, there is a continuing unaddressed need for vehicular components, particularly vehicular lighting components, which are capable of emitting sufficient amounts of light to effectively perform their intended purpose, yet are capable of being substantially concealed, especially while unlit and emitting no light, to provide a vehicle with a sleeker, more elegant appearance.

SUMMARY

At least the above-identified needs are met with the present disclosure. One aspect of the present disclosure is directed to a lamp assembly configured to be mounted to a vehicle. The lamp assembly includes a housing configured to be coupled to a vehicle to mount the lamp assembly to the vehicle. Additionally, the lamp assembly includes at least one light source disposed at least partially within an interior of the housing. The at least one light source is configured to be electrically-connected to the vehicle and emit light based on at least receiving electrical power from the vehicle. Additionally, the lamp assembly includes a transparent polymeric lens coupled to the housing so as to substantially enclose the interior of the housing and the at least one light source. The transparent polymeric lens has an inner surface, an outer surface disposed opposite the inner surface and a chromium-based reflective coating coated on at least a first area of the outer surface. With the at least one light source electrically-connected to the vehicle, the chromium-based reflective coating is at least partially permeable to at least some light which is emitted by the at least one light source and passed through the transparent polymeric lens. Furthermore, at least a second area of the outer surface of the transparent polymeric lens is devoid of the chromium-based reflective coating.

Another aspect of the present disclosure is directed to a lighting module for a vehicular bumper. The lighting module includes at least one light source. The at least one light source is configured to be electrically-connected to a vehicle having a vehicular bumper thereon which includes the lighting module. The at least one light source is further configured to emit light based on at least receiving electrical power from the vehicle. Additionally, the lighting module includes a transparent polymeric portion configured to be coupled to the vehicular bumper so as to form at least part of an outer portion of the vehicular bumper. The transparent polymeric portion has an inner surface, an outer surface disposed opposite the inner surface and a chromium-based reflective coating coated on the outer surface. The chromium-based reflective coating is configured to be at least partially permeable to light emitted by the at least one light source. The transparent polymeric portion further has at least one etching in the chromium-based reflective coating which is devoid of the chromium-based reflective coating so as to expose the outer surface of the transparent polymeric portion within at least one etched gap defined by the at least one etching. Additionally, the lighting module includes at least one light reflector disposed adjacent to the transparent polymeric portion. At least the at least one light reflector and the transparent polymeric portion together define at least one light chamber for containing the at least one light source at least partially therein. With the at least one light source electrically-connected to the vehicle, light emitted by the at least one light source is reflected and distributed by the at least one light reflector, substantially within the at least one light chamber and towards the transparent polymeric portion, so as to simultaneously pass through the chromium-based reflective coating coated on the outer surface of the transparent polymeric portion and the at least one etching in the chromium-based reflective coating.

BRIEF DESCRIPTION OF THE DRAWINGS

One or more exemplary embodiments of the present disclosure are pointed out with particularity in the appended claims. However, other features of the one or more embodiments will become more apparent and will be best understood by referring to the following detailed description in conjunction with the accompanying drawings, wherein:

DETAILED DESCRIPTION

As required, one or more detailed embodiments of the present disclosure are disclosed herein, however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Additionally, various terms and/or phrases describing or indicating a position or directional reference such as "top", "bottom", "front", "rear", "forward", "rearward", "end", etc. may relate to one or more particular components as seen generally from a user's vantage point during use or operation, and/or as positioned relative to a forward/rearward, front-to-back or side-to-side direction of a vehicle, and such terms and/or phrases are not to be interpreted as limiting, but merely as a representative basis for describing the disclosure to one skilled in the art.

Referring generally to FIGS. 1-4C, exemplary lamp assemblies 100, 300 according to the present disclosure are shown and described. The lamp assemblies 100, 300 are each configured to be mounted to a vehicle. As non-limiting examples, such vehicles which may employ the lamp assemblies 100, 300 may include various motor vehicles (e.g. passenger cars, vans, trucks and heavy machinery) and any other vehicles capable of transporting drivers (operators) and/or passengers therein.

Figure 1:
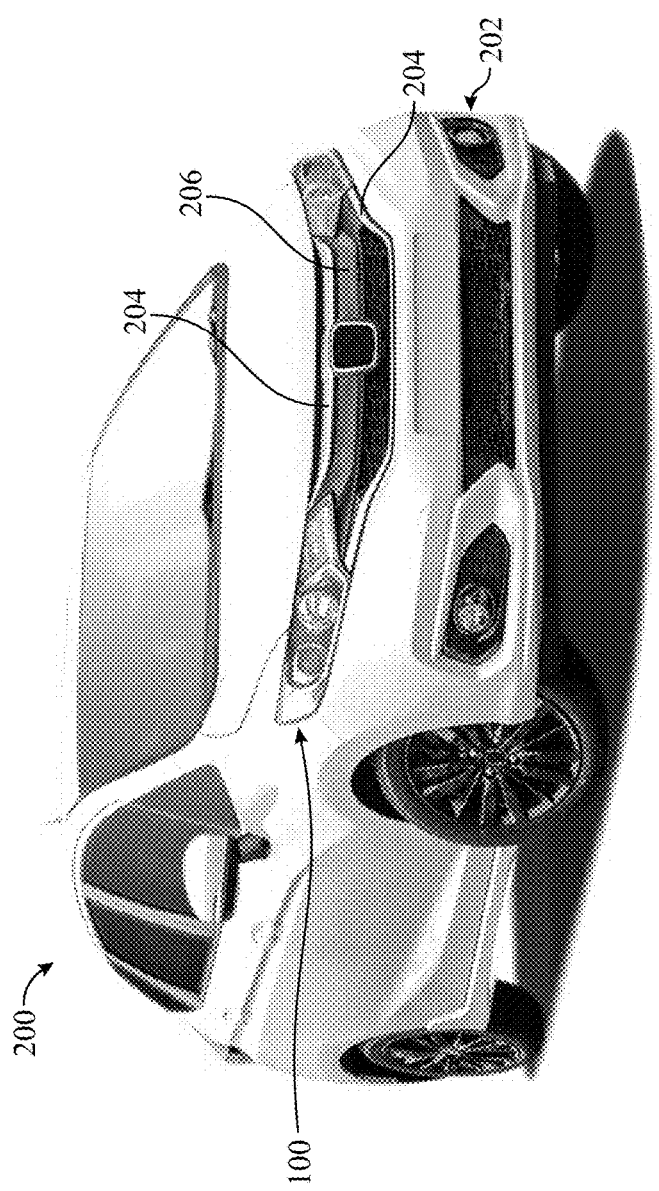
FIG. 1 is a front perspective view of an exemplary vehicle, illustrating an exemplary headlamp assembly mounted to the vehicle, the headlamp assembly including a transparent polymeric lens shown with a chromium-based reflective coating removed from an outer surface of the transparent polymeric lens to better illustrate various light sources of the headlamp assembly.
Figure 2A:
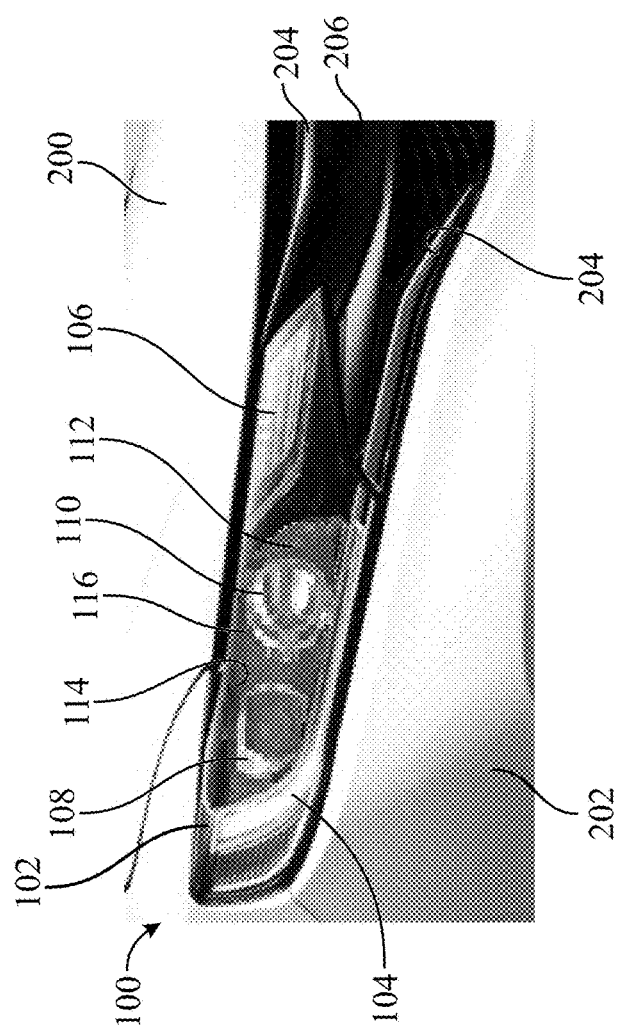
FIG. 2A is a front perspective view of a front portion of the vehicle shown in FIG. 1, further illustrating a front perspective view of the headlamp assembly shown in FIG. 1.
Figure 2B:
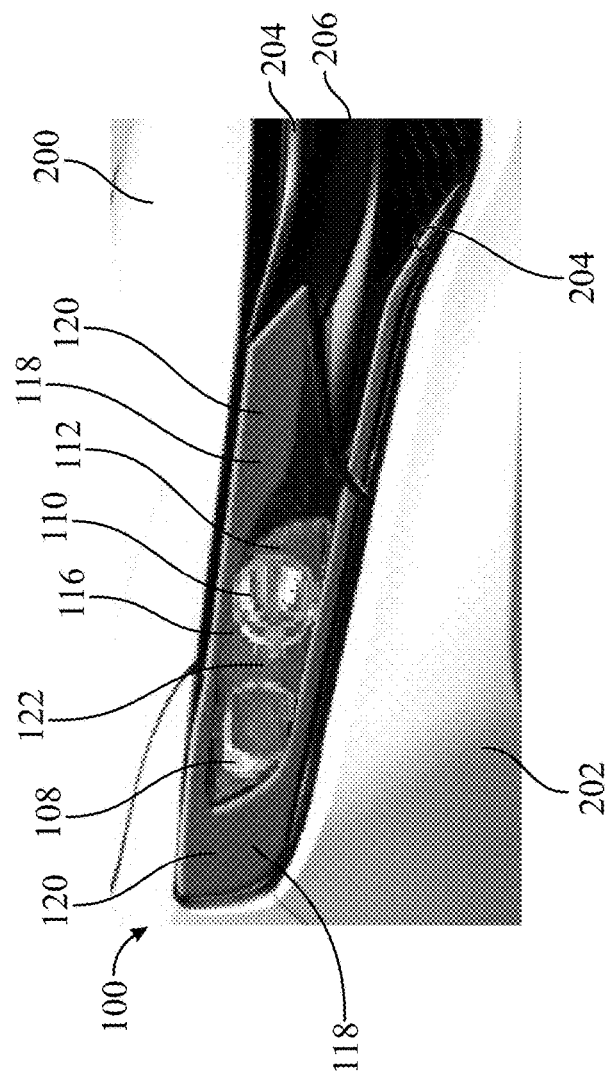
FIG. 2B is the front perspective view of the headlamp assembly shown in FIG. 2A, further illustrating a chromium-based reflective coating coated on at least a first area of the outer surface of the transparent polymeric lens of the headlamp assembly.
Figure 2C:
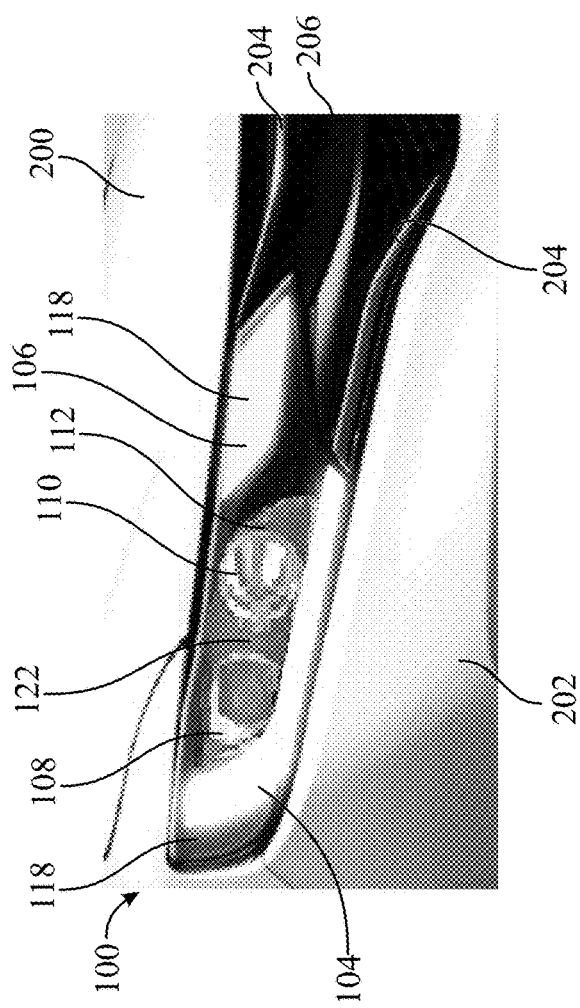
FIG. 2C is the front perspective view of the headlamp assembly shown in FIG. 2B, further illustrating some of the various light sources of the headlamp assembly emitting light through the chromium-based reflective coating coated on at least the first area of the outer surface of the transparent polymeric lens of the headlamp assembly.

FIGS. 1-2C provide multiple views collectively illustrating the exemplary headlamp assembly 100 which is mountable to an exemplary vehicle 200 at a front portion 202 of the vehicle 200. The vehicle 200 may be any kind of vehicle which may employ the headlamp assembly 100, and is not limited to the example as shown herein. The headlamp assembly 100 may be shaped and/or sized in any suitable manner, and is not limited to the example as shown and described herein. The headlamp assembly 100 includes a housing 102 which may have one or more vehicle-attachment features thereon (not shown) to facilitate coupling the housing 102 to the vehicle 200 to mount the headlamp assembly 100 to the front portion 202 of the vehicle 200. As non-limiting examples, the housing 102 may be made from at least one of a metal material (e.g. by a stamping process), a plastic material (e.g. by a thermoforming or injection molding process), or any other suitable material. Furthermore, as non-limiting examples, the one or more vehicle-attachment features on the housing 102 may include one or more of locking tabs, threaded or non-threaded fasteners, clips or other suitable vehicle-attachment features, as may be understood by one of ordinary skill.

As will be further described herein, the headlamp assembly 100 further includes at least one light source 104, 106, 108, 110 disposed at least partially within an interior of the housing 102, as shown in FIGS. 1-2C. The at least one light source 104, 106, 108, 110 may be any suitable type of light source. As non-limiting examples, the at least one light source 104, 106, 108, 110 may comprise at least one of an incandescent light source, a light-emitting diode (LED) light source, or a combination of incandescent and light-emitting diode (LED) light sources. The at least one light source 104, 106, 108, 110 may be electrically-connected to the vehicle 200 and is configured to emit light based on at least receiving electrical power from the vehicle 200, such as from an electrical power source (e.g. vehicle electrical system, battery, etc.) on the vehicle 200. As non-limiting examples, the at least one light source 104, 106, 108, 110 may be electrically-connected to the vehicle 200 by way of one or more wiring harnesses or other suitable electrical connectors (not shown), as may be understood by one of ordinary skill.

As shown in FIGS. 1-2C, the headlamp assembly 100 further includes a transparent polymeric lens 112 coupled to the housing 102 so as to substantially enclose the interior of the housing 102 and the at least one light source 104, 106, 108, 110. As such, the interior of the housing 102 and the at least one light source 104, 106, 108, 110 may be substantially sealed and protected from an outside environment surrounding the vehicle 200. The transparent polymeric lens 112 has an inner surface 114, an outer surface 116 disposed opposite the inner surface 114 and a chromium-based reflective coating 118 coated on at least a first area 120 of the outer surface 116 of the transparent polymeric lens 112. As shown in FIGS. 1-2C, at least a second area 122 of the outer surface 116 of the transparent polymeric lens 112, which may constitute a majority of the outer surface 116 of the transparent polymeric lens 112, may be entirely devoid of the chromium-based reflective coating 118. At least the second area 122 of the outer surface 116 of the transparent polymeric lens 112 being entirely devoid of the chromium-based reflective coating 118 may be advantageous in order for the headlamp assembly 100 to still effectively carry out certain functions or purposes during operation, as will be further described herein. Furthermore, as will be further described herein, with the at least one light source 104, 106, 108, 110 electrically-connected to the vehicle 200, the chromium-based reflective coating 118 is at least partially permeable to at least some light which is emitted by the at least one light source 104, 106, 108, 110 (e.g. light sources 104, 106 in this example), as shown in FIG. 2C. Additionally, as shown in FIGS. 1-2C, one or more internal light reflectors (e.g. foils or other metallic light reflectors) and/or internal transparent polymeric lenses (e.g. clear and/or colored plastic lenses) may be disposed within the housing 102 of the headlamp assembly 100 behind the transparent polymeric lens 112 to facilitate homogenizing, reflecting and guiding the light emitted by the at least one light source 104, 106, 108, 110 in an outwardly direction to pass through the transparent polymeric lens 112 and, depending on the particular light source or light sources emitting the light, the chromium-based reflective coating 118 coated on at least the first area 120 of the outer surface 116 of the transparent polymeric lens 112.

As shown particularly in FIGS. 2A-2C, the at least one light source 104, 106, 108, 110 may comprise a plurality of light sources 104, 106, 108, 110. As shown in FIGS. 2B and 2C, a first number (e.g. light sources 104, 106 in this example) of the plurality of light sources 104, 106, 108, 110, while unlit and emitting no light, is advantageously concealed behind the chromium-based reflective coating 118 coated on at least the first area 120 of the outer surface 116 of the transparent polymeric lens 112. Furthermore, a second number (e.g. light sources 108, 110 in this example) of the plurality of light sources 104, 106, 108, 110, whether lit and emitting light or unlit and emitting no light, is advantageously visible through the transparent polymeric lens 112 by way of at least the second area 122 of the outer surface 116 of the transparent polymeric lens 112 which is devoid of the chromium-based reflective coating 118. As non-limiting examples, the first number of the plurality of light sources 104, 106, 108, 110 may comprise at least one of a daytime running light unit 104 (e.g. capable of emitting white colored light to meet regulations in certain jurisdictions) and a vehicle turn signal light unit 106 (e.g. capable of emitting amber colored light to meet regulations in certain jurisdictions). Furthermore, as non-limiting examples, the second number of the plurality of light sources 104, 106, 108, 110 may comprise at least one of a high-beam light unit 108 and a low-beam light unit 110 (e.g. xenon, halogen or light-emitting diode (LED) light units). It is to be appreciated that the second area 122 of the outer surface 116 of the transparent polymeric lens 112 which is devoid of the chromium-based reflective coating 118 advantageously defines and provides a sufficiently-sized, higher transparency area of the transparent polymeric lens 112 to permit high or low light beams to effectively project therethrough and safely out in front of the vehicle 200 during vehicle operation.

As shown in FIGS. 2A-2C, with the headlamp assembly 100 mounted to the front portion 202 of the vehicle 200, the chromium-based reflective coating 118 coated on at least the first area 120 of the outer surface 116 of the transparent polymeric lens 112 is positioned to aesthetically correspond to, and advantageously appear substantially merged with, a metallic reflective coating 204, or the like (e.g. exhibiting a decorative chrome or mirror-like surface finish), coated on at least a portion of at least one vehicular component 206 mounted to the vehicle 200 immediately adjacent to the headlamp assembly 100. As non-limiting examples, the at least one vehicular component 206 mounted to the vehicle 200 immediately adjacent to the headlamp assembly 100 is selected from the group consisting of an exterior trim piece, a front exterior trim piece, a front grill, a front bumper and a headlamp bezel. As may be appreciated by one of ordinary skill, the chromium-based reflective coating 118 coated on at least the first area 120 of the outer surface 116 of the transparent polymeric lens 112 is capable of exhibiting a decorative chrome or mirror-like surface finish, which may be aesthetically matched or substantially aesthetically matched in appearance to the metallic reflective coating 204, or the like, coated on at least the portion of the at least one vehicular component 206 mounted to the vehicle 200 immediately adjacent to the headlamp assembly 100. In this regard, it is highly ideal and advantageous that the chromium-based reflective coating 118 be coated on the outer surface 116 of the transparent polymeric lens 112 (e.g. the outermost surface of the transparent polymeric lens 112 which is touchable by a person with the headlamp assembly 100 mounted to the vehicle 200), such as, in this example, on at least the first area 120 of the outer surface 116 of the transparent polymeric lens 112. In other words, the chromium-based reflective coating 118 being coated on a different surface, such as on the inner surface 114 of the transparent polymeric lens 112, may not be capable of exhibiting, at an acceptable or desirable level, a decorative chrome or mirror-like surface finish which is aesthetically matched or substantially aesthetically matched in appearance to the metallic reflective coating 204, or the like, coated on at least the portion of the at least one vehicular component 206 mounted to the vehicle 200 immediately adjacent to the headlamp assembly 100. As such, due to at least its composition of materials (as will be further described herein in more detail) and being coated on the transparent polymeric lens 112 (e.g. a transparent substrate), the chromium-based reflective coating 118 is at least (i) advantageously capable of passing a sufficient amount of light therethrough emitted by the at least one light source 104, 106, 108, 110 (e.g. the vehicle daytime running light unit 104 and the vehicle turn signal light unit 106 in this example) to permit the at least one light source 104, 106, 108, 110 (e.g. the vehicle daytime running light unit 104 and the vehicle turn signal light unit 106 in this example) to effectively perform its intended purpose, and (ii) capable of providing the headlamp assembly 100 an appearance (e.g. decorative appearance) which aesthetically harmonizes and/or substantially merges with the appearance (e.g. decorative appearance) of the at least one vehicular component 206 mounted to the vehicle 200 immediately adjacent to the headlamp assembly 100.

Figure 3:
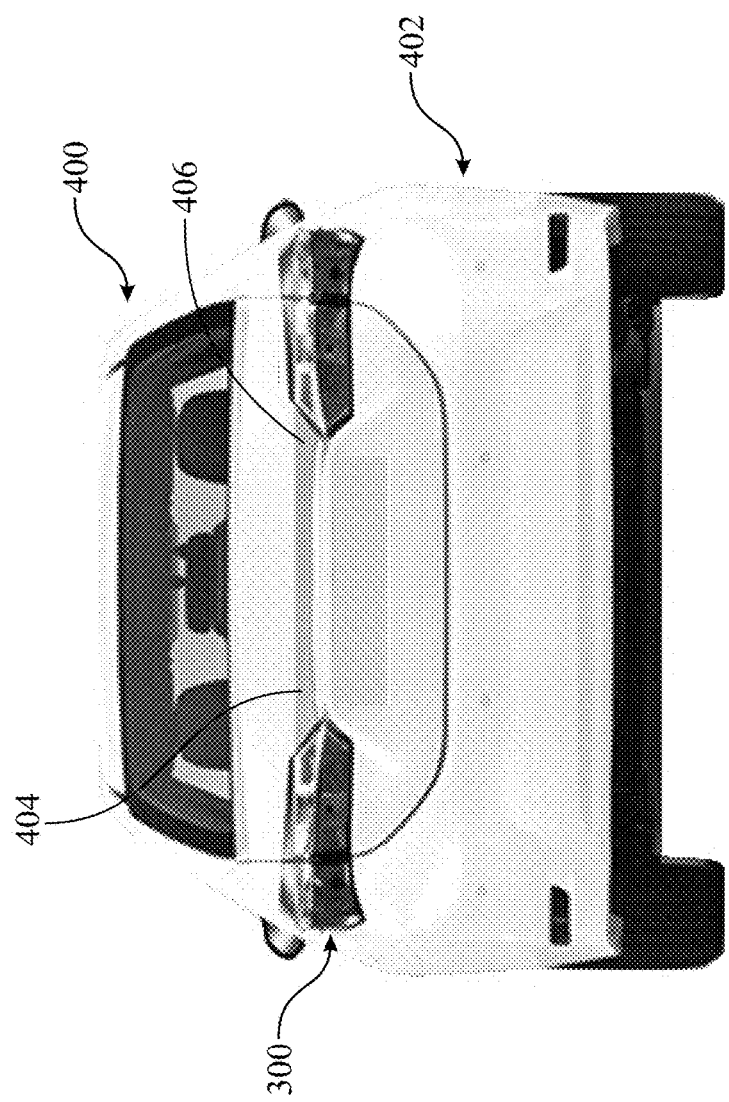
FIG. 3 is a rear view of another exemplary vehicle, illustrating an exemplary tail lamp assembly mounted to the vehicle, the tail lamp assembly including a transparent polymeric lens shown with a chromium-based reflective coating removed from an outer surface of the transparent polymeric lens to better illustrate various light sources of the tail lamp assembly.
Figure 4A:
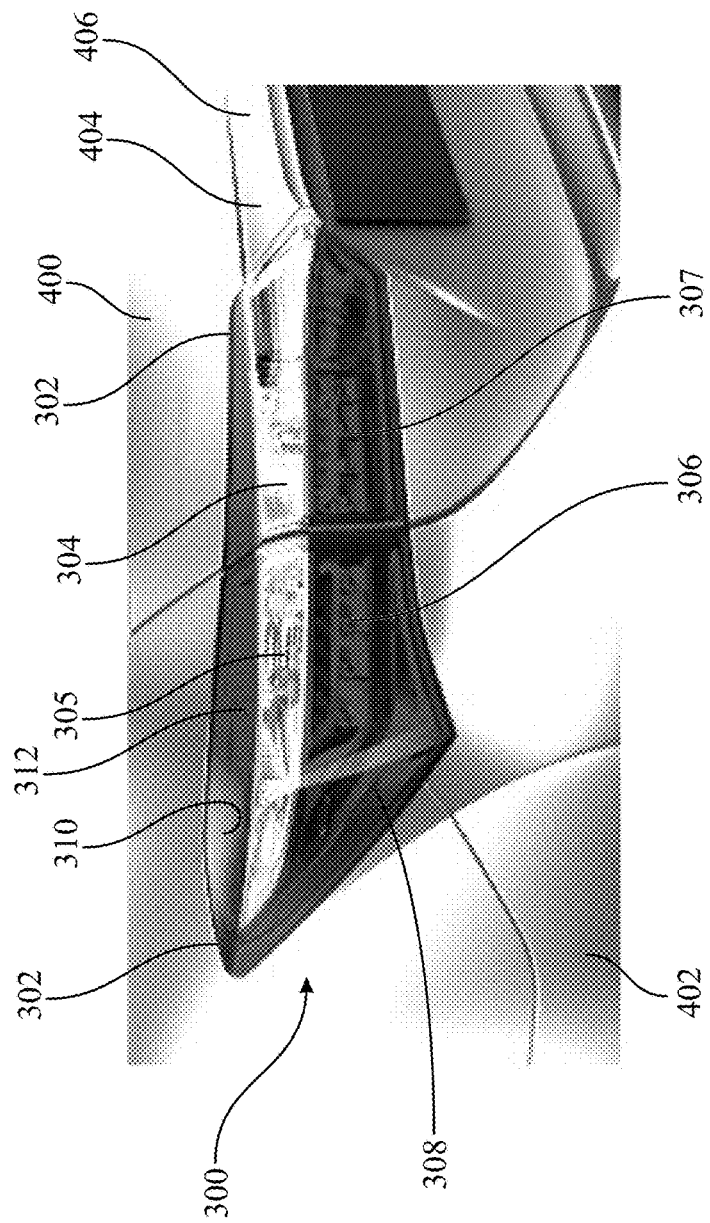
FIG. 4A is a rear perspective view of a rear portion of the vehicle shown in FIG. 3, further illustrating a rear perspective view of the tail lamp assembly shown in FIG. 3.
Figure 4B:
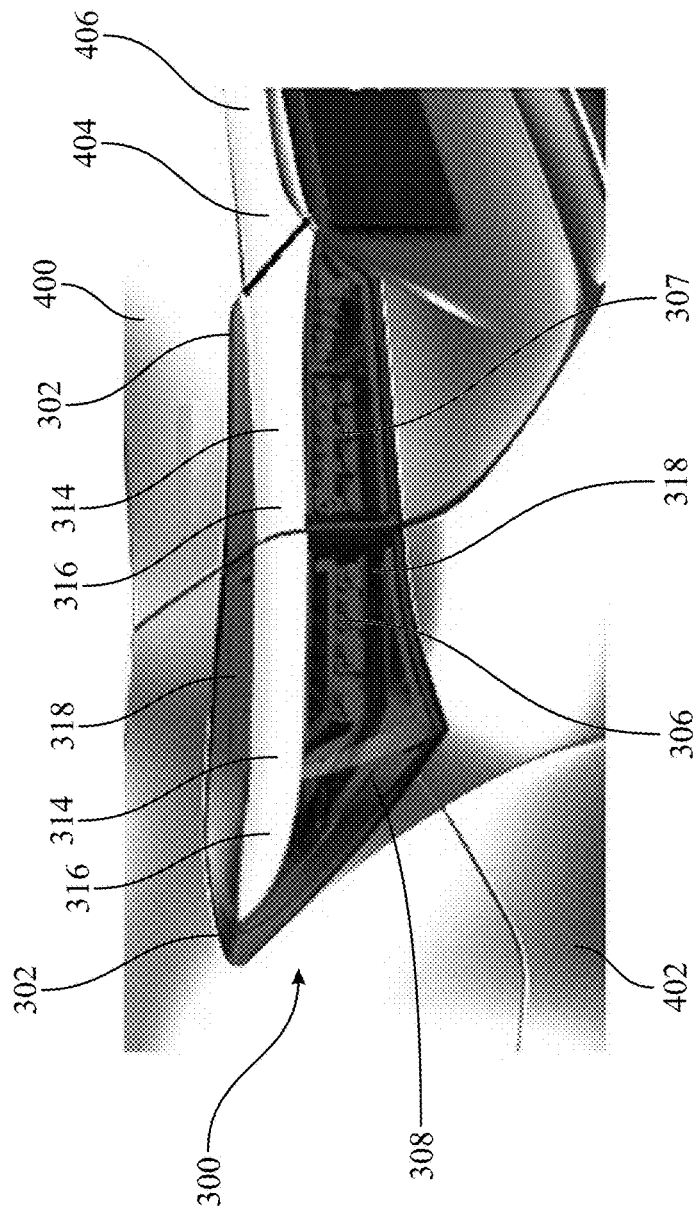
FIG. 4B is the rear perspective view of the tail lamp assembly shown in FIG. 4A, further illustrating a chromium-based reflective coating coated on at least a first area of the outer surface of the transparent polymeric lens of the tail lamp assembly.
Figure 4C:
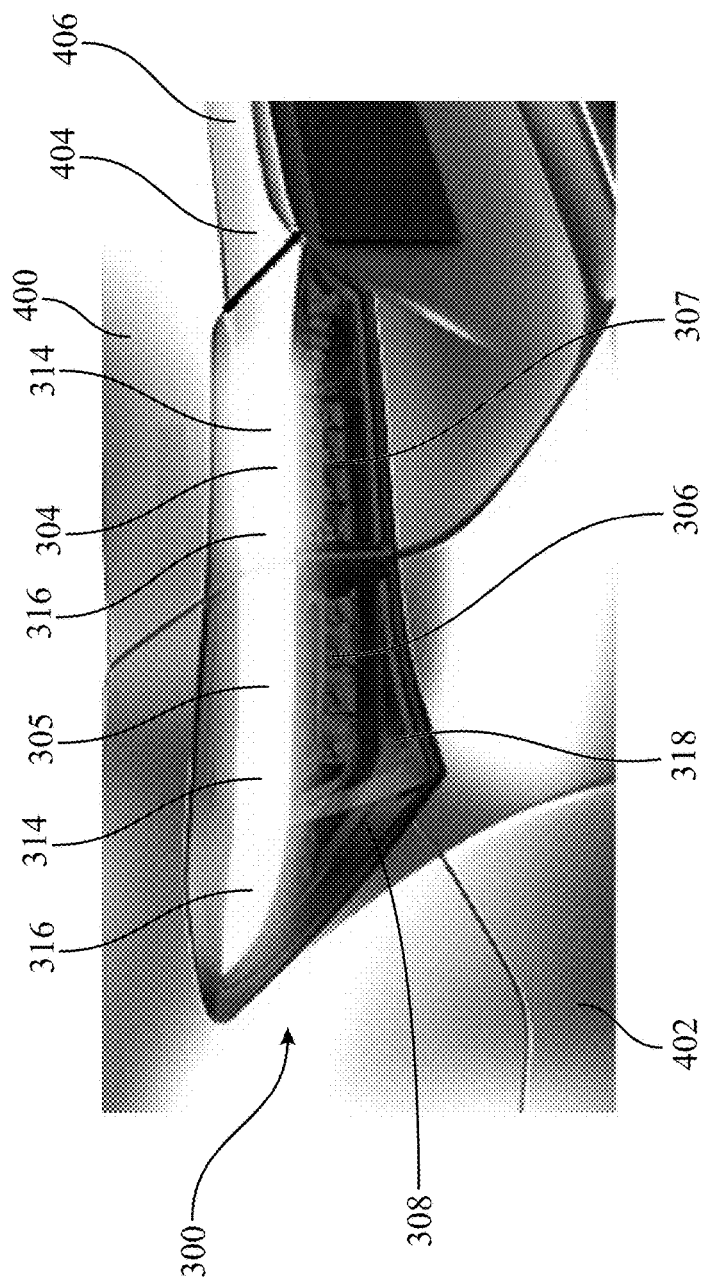
FIG. 4C is the rear perspective view of the tail lamp assembly shown in FIG. 4B, further illustrating some of the various light sources of the tail lamp assembly emitting light through the chromium-based reflective coating coated on at least the first area of the outer surface of the transparent polymeric lens of the tail lamp assembly.

FIGS. 3-4C provide multiple views collectively illustrating the exemplary tail lamp assembly 300 which is mountable to an exemplary vehicle 400 at a rear portion 402 of the vehicle 400. The vehicle 400 may be any kind of vehicle which may employ the tail lamp assembly 300, and is not limited to the example as shown and described herein. The tail lamp assembly 300 may be shaped and/or sized in any suitable manner, and is not limited to the example as shown herein. Additionally, the tail lamp assembly 300 may be a one-piece assembly or a divided multi-piece assembly (as shown in this example), depending on such factors as a mounting location of the tail lamp assembly 300 relative to a rear hatch, a rear trunk lid or a rear door of the vehicle 400. The tail lamp assembly 300 includes a housing 302 which may have one or more vehicle-attachment features thereon (not shown) to facilitate coupling the housing 302 to the vehicle 400 to mount the tail lamp assembly 300 to the rear portion 402 of the vehicle 400. As non-limiting examples, the housing 302 may be made from at least one of a metal material (e.g. by a stamping process), a plastic material (e.g. by a thermoforming or injection molding process), or any other suitable material. Furthermore, as non-limiting examples, the one or more vehicle-attachment features on the housing 302 may include one or more of locking tabs, threaded or non-threaded fasteners, clips and other suitable vehicle-attachment features, as may be understood by one of ordinary skill.

As will be further described herein, the tail lamp assembly 300 further includes at least one light source 304, 305, 306, 307 disposed at least partially within an interior of the housing 302, as shown in FIGS. 3-4C. The at least one light source 304, 305, 306, 307 may be any suitable type of light source. As non-limiting examples, the at least one light source 304, 305, 306, 307 may comprise at least one of an incandescent light source, a light-emitting diode (LED) light source, or a combination of incandescent and light-emitting diode (LED) light sources. The at least one light source 304, 305, 306, 307 may be electrically-connected to the vehicle 400 and is configured to emit light based on at least receiving electrical power from the vehicle 400, such as from an electrical power source (e.g. vehicle electrical system, battery, etc.) on the vehicle 400. As non-limiting examples, the at least one light source 304, 305, 306, 307 may be electrically-connected to the vehicle 400 by way of one or more wiring harnesses or other suitable electrical connectors (not shown), as may be understood by one of ordinary skill.

As shown in FIGS. 3-4C, the tail lamp assembly 300 further includes a transparent polymeric lens 308 coupled to the housing 302 so as to substantially enclose the interior of the housing 302 and the at least one light source 304, 305, 306, 307. As such, the interior of the housing 302 and the at least one light source 304, 305, 306, 307 may be substantially sealed and protected from an outside environment surrounding the vehicle 400. The transparent polymeric lens 308 has an inner surface 310, an outer surface 312 disposed opposite the inner surface 310 and a chromium-based reflective coating 314 coated on at least a first area 316 of the outer surface 312 of the transparent polymeric lens 308. As shown in FIGS. 3-4C, at least a second area 318 of the outer surface 312 of the transparent polymeric lens 308, which may constitute a majority of the outer surface 312 of the transparent polymeric lens 308, may be entirely devoid of the chromium-based reflective coating 314. At least the second area 318 of the outer surface 312 of the transparent polymeric lens 308 being entirely devoid of the chromium-based reflective coating 314 may be advantageous in order for the tail lamp assembly 300 to still effectively carry out certain functions or purposes during operation, as will be further described herein. Furthermore, as will be further described herein, with the at least one light source 304, 305, 306, 307 electrically-connected to the vehicle 400, the chromium-based reflective coating 314 is at least partially permeable to at least some light which is emitted by the at least one light source 304, 305, 306, 307 (e.g. light sources 304, 305 in this example), as shown in FIG. 4C. Additionally, as shown in FIGS. 3-4C, one or more internal light reflectors (e.g. foils or other metallic light reflectors) and/or internal transparent polymeric lenses (e.g. clear and/or colored plastic lenses) may be disposed within the housing 302 of the tail lamp assembly 300 behind the transparent polymeric lens 308 to facilitate homogenizing, reflecting and guiding the light emitted by the at least one light source 304, 305, 306, 307 in an outwardly direction to pass through the transparent polymeric lens 308 and, depending on the particular light source or light sources emitting the light, the chromium-based reflective coating 314 coated on at least the first area 316 of the outer surface 312 of the transparent polymeric lens 308.

As shown particularly in FIGS. 4A-4C, the at least one light source 304, 305, 306, 307 may comprise a plurality of light sources 304, 305, 306, 307. As shown in FIGS. 4B and 4C, a first number (e.g. light sources 304, 305 in this example) of the plurality of light sources 304, 305, 306, 307, while unlit and emitting no light, is advantageously concealed behind the chromium-based reflective coating 314 coated on at least the first area 316 of the outer surface 312 of the transparent polymeric lens 308. Furthermore, a second number (e.g. light sources 306, 307 in this example) of the plurality of light sources 304, 305, 306, 307, whether lit and emitting light or unlit and emitting no light, is advantageously visible through the transparent polymeric lens 308 by way of at least the second area 318 of the outer surface 312 of the transparent polymeric lens 308 which is devoid of the chromium-based reflective coating 314. As non-limiting examples, the first number of the plurality of light sources 304, 305, 306, 307 may comprise at least one of a vehicle reverse light unit 304 (e.g. capable of emitting white colored light to meet regulations in certain jurisdictions) and a vehicle turn signal light unit 305 (e.g. capable of emitting amber colored light to meet regulations in certain jurisdictions). Furthermore, as non-limiting examples, the second number of the plurality of light sources 304, 305, 306, 307 may comprise at least one vehicle tail and stop light unit 306, 307 (e.g. which may ultimately emit red colored light through a red colored lens of the tail lamp assembly 300, the red colored lens substantially defining the second area 318 of the outer surface 312 of the transparent polymeric lens 308 which is devoid of the chromium-based reflective coating 314, in this example). It is to be appreciated that the second area 318 of the outer surface 312 of the transparent polymeric lens 308 which is devoid of the chromium-based reflective coating 314 advantageously defines and provides a sufficiently-sized, higher transparency area of the transparent polymeric lens 308 to permit a sufficiently large, visible amount of tail lamp lighting (e.g. emitted by the at least one tail and stop light unit 306, 307 in this example) to effectively project therethrough and out rearwardly of the vehicle 400 during vehicle operation.

As shown in FIGS. 4A-4C, with the tail lamp assembly 300 mounted to the rear portion 402 of the vehicle 400, the chromium-based reflective coating 314 coated on at least the first area 316 of the outer surface 312 of the transparent polymeric lens 308 is positioned to aesthetically correspond to, and advantageously appear substantially merged with, a metallic reflective coating 404, or the like (e.g. exhibiting a decorative chrome or mirror-like surface finish), coated on at least a portion of at least one vehicular component 406 mounted to the vehicle 400 immediately adjacent to the tail lamp assembly 300. As non-limiting examples, the at least one vehicular component 406 mounted to the vehicle 400 immediately adjacent to the tail lamp assembly 300 is selected from the group consisting of an exterior trim piece, a rear exterior trim piece, a rear bumper and a tail lamp bezel. As may be appreciated by one of ordinary skill, the chromium-based reflective coating 314 coated on at least the first area 316 of the outer surface 312 of the transparent polymeric lens 308 is capable of exhibiting a decorative chrome or mirror-like surface finish, which may be aesthetically matched or substantially aesthetically matched in appearance to the metallic reflective coating 404, or the like, coated on at least the portion of the at least one vehicular component 406 mounted to the vehicle 400 immediately adjacent to the tail lamp assembly 300. In this regard, it is highly ideal and advantageous that the chromium-based reflective coating 314 be coated on the outer surface 312 of the transparent polymeric lens 308 (e.g. the outermost surface of the transparent polymeric lens 308 which is touchable by a person with the tail lamp assembly 300 mounted to the vehicle 400), such as, in this example, on at least the first area 316 of the outer surface 312 of the transparent polymeric lens 308. In other words, the chromium-based reflective coating 314 being coated on a different surface, such as on the inner surface 310 of the transparent polymeric lens 308, may not be capable of exhibiting, at an acceptable or desirable level, a decorative chrome or mirror-like surface finish which is aesthetically matched or substantially aesthetically matched in appearance to the metallic reflective coating 404, or the like, coated on at least the portion of the at least one vehicular component 406 mounted to the vehicle 400 immediately adjacent to the tail lamp assembly 300. As such, due to at least its composition of materials (as will be further described herein in more detail) and being coated on the transparent polymeric lens 308 (e.g. a transparent substrate), the chromium-based reflective coating 314 is at least (i) advantageously capable of passing a sufficient amount of light therethrough emitted by the at least one light source 304, 305, 306, 307 (e.g. the vehicle reverse light unit 304 and the vehicle turn signal light unit 305 in this example) to permit the at least one light source 304, 305, 306, 307 (e.g. the vehicle reverse light unit 304 and the vehicle turn signal light unit 305 in this example) to effectively perform its intended purpose, and (ii) capable of providing the tail lamp assembly 300 an appearance (e.g. decorative appearance) which aesthetically harmonizes and/or substantially merges with the appearance (e.g. decorative appearance) of the at least one vehicular component 406 mounted to the vehicle 400 immediately adjacent to the tail lamp assembly 300.

Referring generally to FIGS. 5A-6B, two exemplary lighting modules 500, 700 for respective exemplary vehicular bumpers 600, 800 (which may each be a vehicular front bumper, but is not limited thereto) according to the present disclosure are schematically shown and described. As non-limiting examples, such vehicles having a vehicular bumper thereon (e.g. at least one of the vehicular bumpers 600, 800) which includes at least one of the lighting modules 500, 700 may include various motor vehicles (e.g. passenger cars, vans, trucks and heavy machinery) and any other vehicles capable of transporting drivers (operators) and/or passengers therein.

As shown in FIGS. 5A-6B, multiple schematic views collectively illustrating the two exemplary lighting modules 500, 700 for the respective exemplary vehicular bumpers 600, 800 are provided. The vehicular bumpers 600, 800 may be shaped and/or sized in any suitable manner and are not limited to the examples as schematically shown and described herein. As non-limiting examples, the vehicular bumpers 600, 800 may be made from at least one of a metal material (e.g. by a stamping process), a plastic material (e.g. by a thermoforming or injection molding process), or any other suitable material or combination of suitable materials (e.g. metal materials, plastic materials, composite materials, energy/impact-absorbing materials, etc.). Additionally, as may be understood by one of ordinary skill, the vehicular bumpers 600, 800 may include various vehicle-attachment features thereon (e.g. clips, bolts and/or other suitable fasteners) to facilitate coupling either of the vehicular bumpers 600, 800 to a vehicle (not shown). The lighting modules 500, 700 each include at least one light source 502, 504; 702, 704, 706, 708. As non-limiting examples, the at least one light source 502, 504; 702, 704, 706, 708 may comprise at least one of an incandescent light source, a light-emitting diode (LED) light source, or a combination of incandescent and light-emitting diode (LED) light sources. The at least one light source 502, 504; 702, 704, 706, 708 may be electrically-connected to the vehicle (not shown) which has at least one of the vehicular bumpers 600, 800 thereon which includes the respective lighting module 500, 700. The at least one light source 502, 504; 702, 704, 706, 708 may be electrically-connected to the vehicle by way of one or more wiring harnesses or other suitable electrical connectors (not shown), as may be understood by one of ordinary skill. As will be further described herein, the at least one light source 502, 504; 702, 704, 706, 708 is configured to emit light based on at least receiving electrical power from the vehicle, such as from an electrical power source (e.g. vehicle electrical system, battery, etc.) on the vehicle, as may be understood by one of ordinary skill.

Figure 5A:
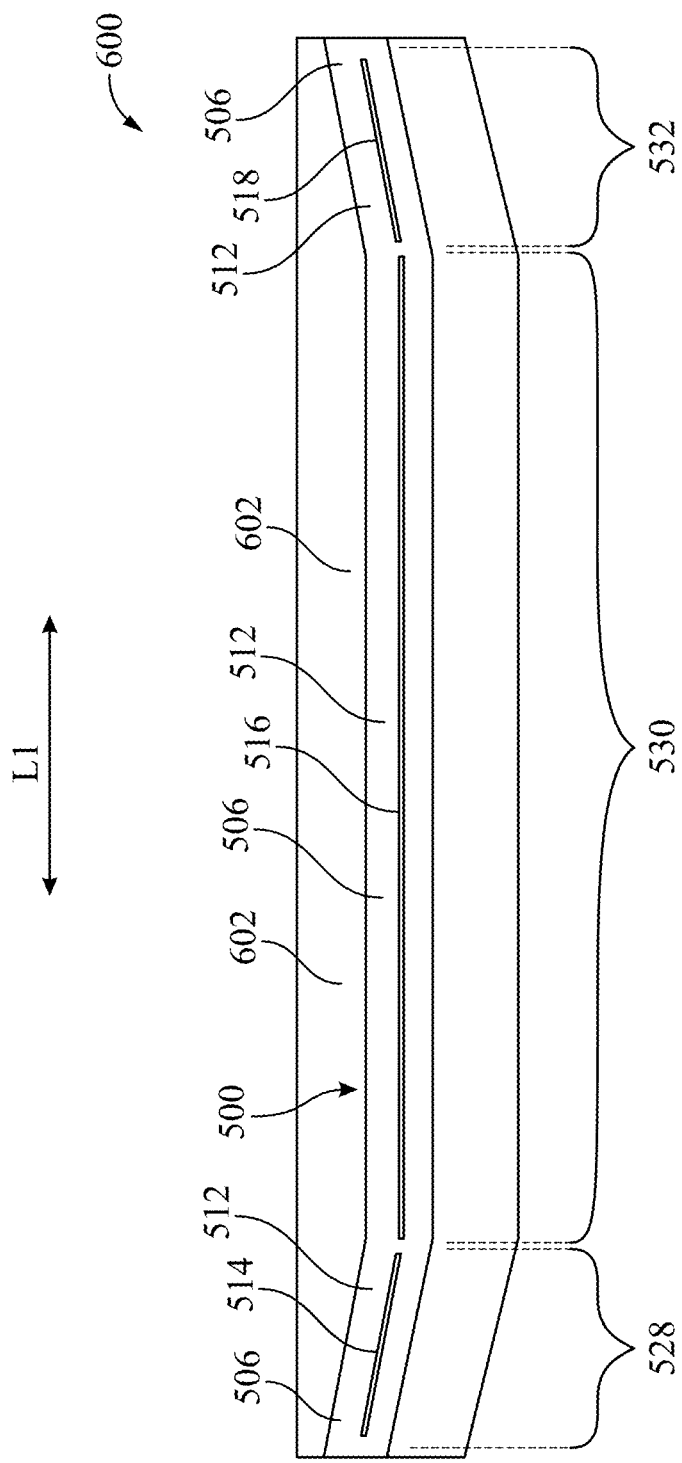
FIG. 5A is a schematic diagram illustrating a front view of an exemplary vehicular bumper having an exemplary lighting module included thereon.
Figure 5B:
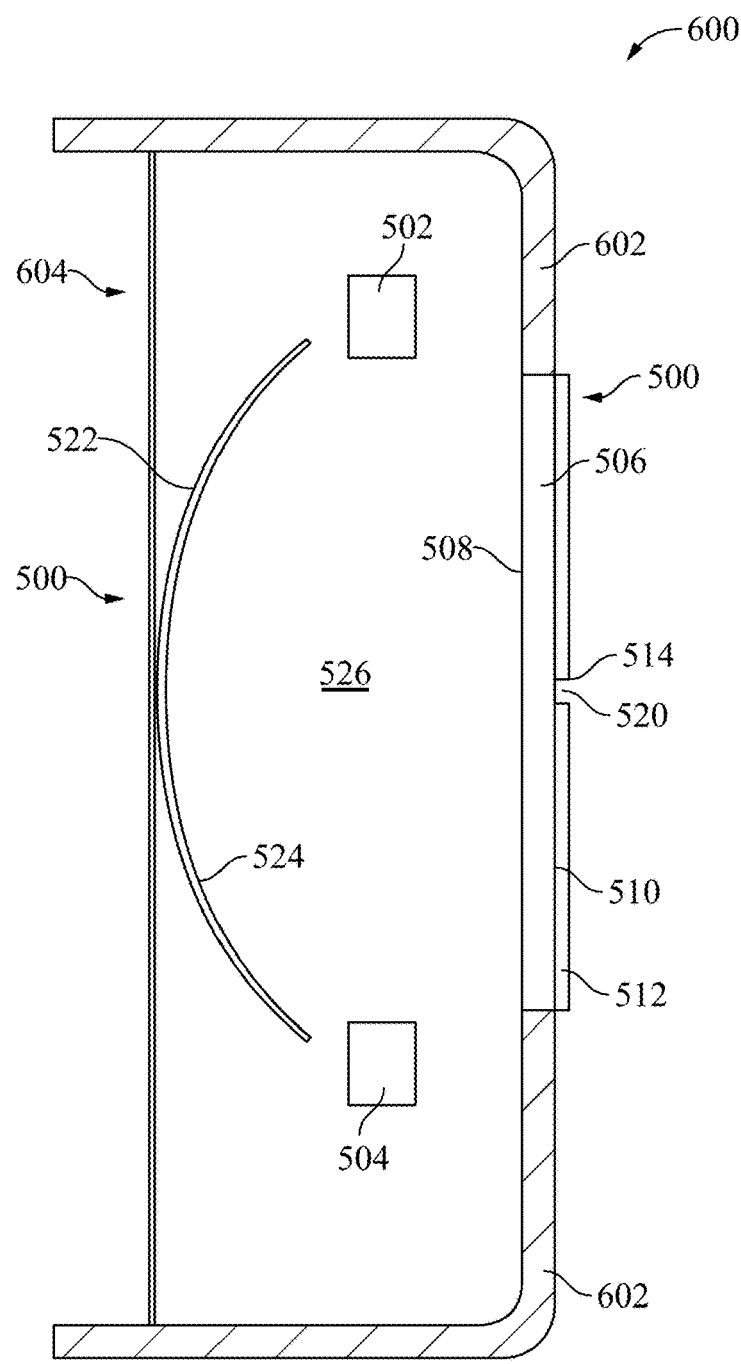
FIG. 5B is a schematic diagram further illustrating an enlarged sectional end view of the vehicular bumper shown in FIG. 5A having the lighting module included thereon.
Figure 6A:
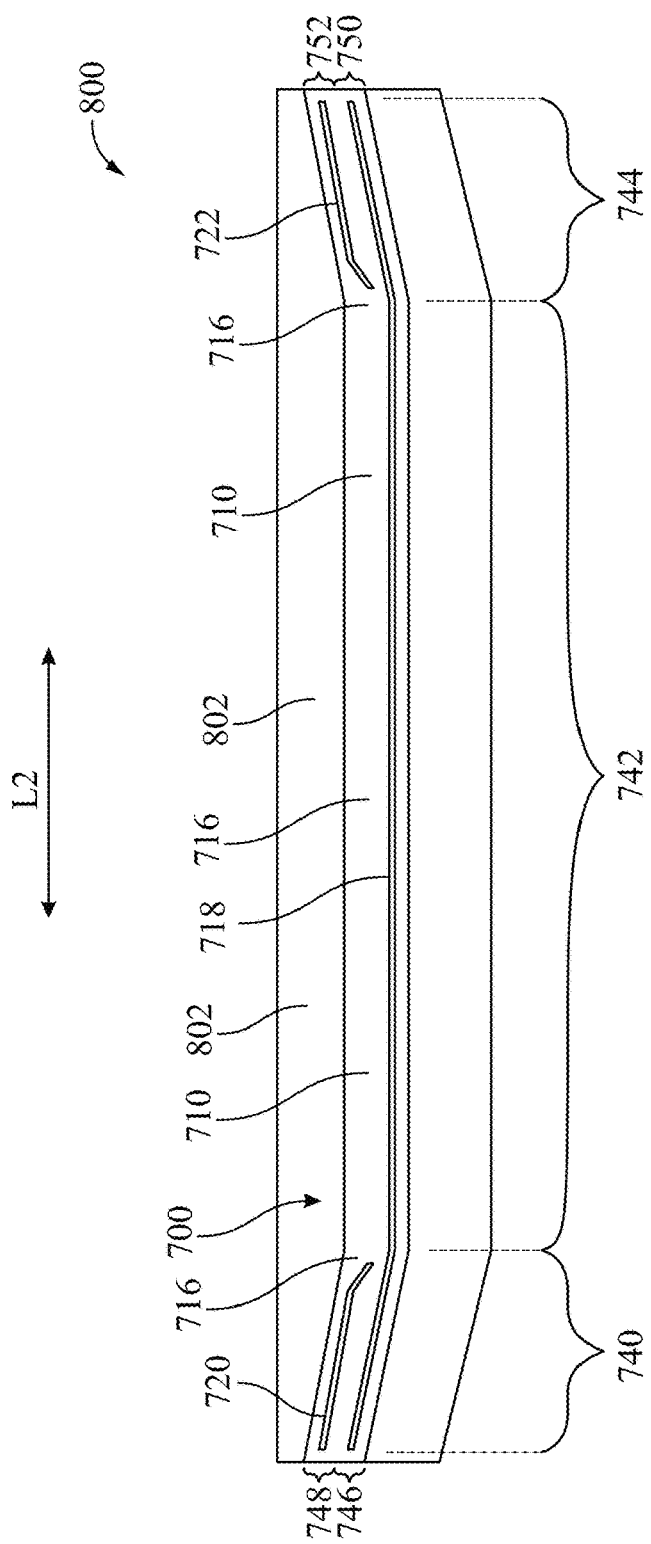
FIG. 6A is a schematic diagram illustrating a front view of another exemplary vehicular bumper having another exemplary lighting module included thereon.
Figure 6B:
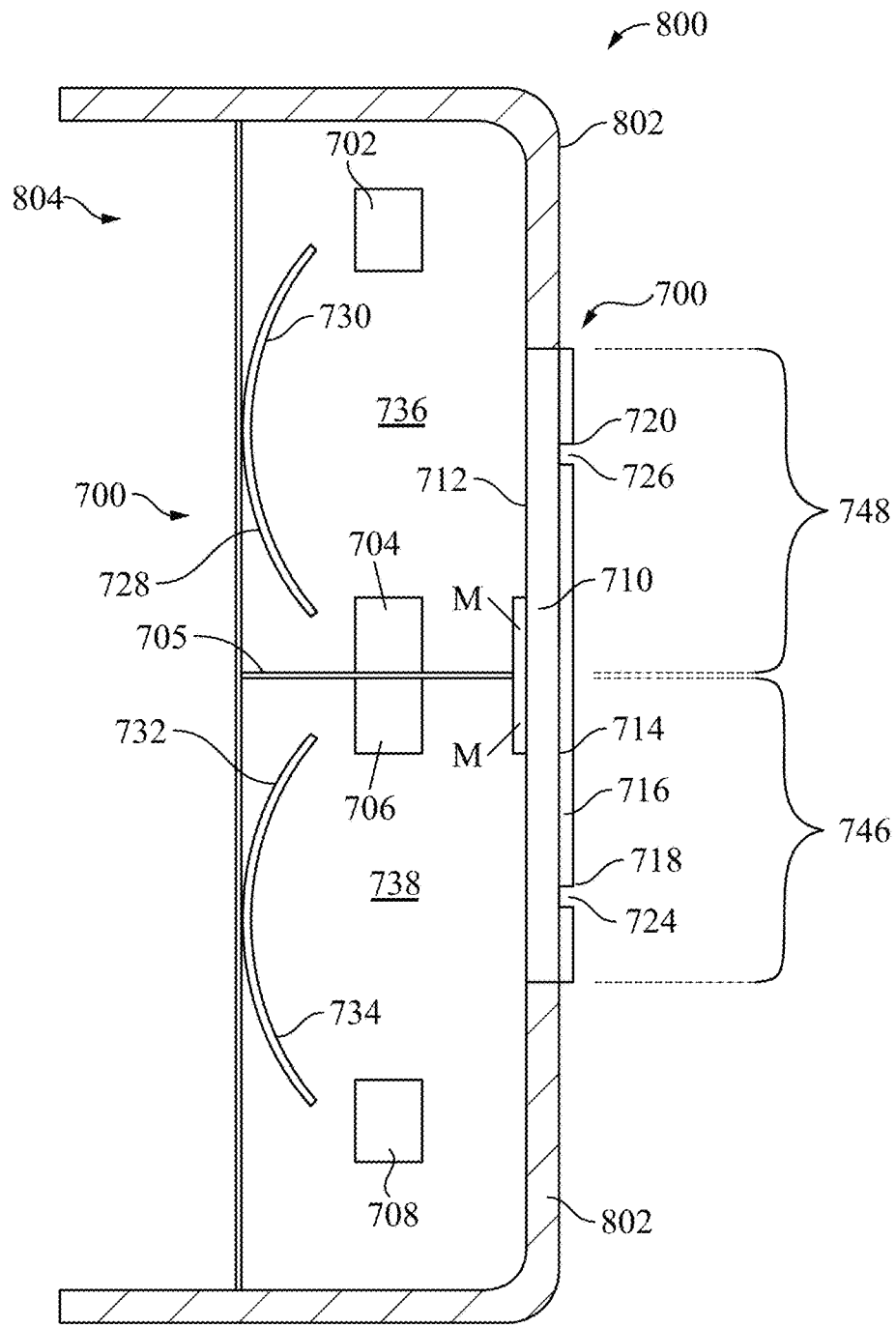
FIG. 6B is a schematic diagram further illustrating an enlarged sectional end view of the vehicular bumper shown in FIG. 6A having the lighting module included thereon.

As shown in FIGS. 5A-6B, each of the lighting modules 500, 700 for the respective vehicular bumpers 600, 800 further include a transparent polymeric portion 506, 710 configured to be coupled to the respective vehicular bumper 600, 800 so as to form at least part of an outer portion 602, 802 of the respective vehicular bumper 600, 800. As non-limiting examples, each of the transparent polymeric portions 506, 710 may be coupled to the respective vehicular bumpers 600, 800 by employing at least one of suitable fasteners, one or more adhesives, or a manufacturing process (e.g. ultrasonic welding, multi-shot injection molding, etc.), as may be understood by one of ordinary skill. In any case, when coupled to the respective vehicular bumper 600, 800, each of the transparent polymeric portions 506, 710 ultimately form at least part of the outer portion 602, 802 of the respective vehicular bumper 600, 800, as previously described herein. As shown particularly in FIGS. 5B and 6B, the transparent polymeric portions 506, 710, which will be further described herein, each have an inner surface 508, 712, an outer surface 510, 714 disposed opposite the inner surface 508, 712 and a chromium-based reflective coating 512, 716 coated on the outer surface 510, 714. As will also be further described herein, the chromium-based reflective coating 512, 716 is configured to be at least partially permeable to light emitted by the at least one light source 502, 504; 702, 704, 706, 708 of the respective lighting modules 500, 700. Each of the transparent polymeric portions 506, 710 further have at least one etching 514, 516, 518; 718, 720, 722 in the respective chromium-based reflective coating 512, 716. The at least one etching 514, 516, 518; 718, 720, 722 is devoid of the respective chromium-based reflective coating 512, 716 so as to expose the outer surface 510, 714 of the respective transparent polymeric portion 506, 710 within at least one etched gap 520; 724, 726 defined by the at least one etching 514, 516, 518; 718, 720, 722, as shown in FIGS. 5B and 6B. As non-limiting examples, the at least one etching 514, 516, 518; 718, 720, 722 in the respective chromium-based reflective coating 512, 716 may be produced by a manufacturing process such as laser etching or laser engraving. Furthermore, the at least one etching 514, 516, 518; 718, 720, 722 in the respective chromium-based reflective coating 512, 716 may be shaped and/or sized so as to form various graphics, patterns, shaped outlines, indicia, or other desired etchings. As such, the shape and/or size of the at least one etching 514, 516, 518; 718, 720, 722 in the respective chromium-based reflective coating 512, 716 is not limited to the examples as schematically shown and described herein, and may be of any desired shape and/or size. Additionally, as shown in FIGS. 5A and 6A, as a non-limiting example, at least a majority of each of the transparent polymeric portions 506, 710 may be elongated so as to extend along a length of the respective vehicular bumpers 600, 800 in an end-to-end direction L1, L2 of the respective vehicular bumpers 600, 800. In this manner, the transparent polymeric portions 506, 710 may each form or exhibit a shape of a continuously-extending strip having a chrome or mirror-like decorative appearance (e.g. provided from the respective chromium-based reflective coating 512, 716 coated thereon), which may blend in with, or be distinct from other metallic reflective coatings coated on other surrounding vehicular components and/or other portions of the respective vehicular bumpers 600, 800. In any case, as may be understood by one of ordinary skill, the transparent polymeric portions 506, 710 may each be shaped, sized and/or divided in any desired manner, and are not limited to the examples schematically shown and described herein.

Referring to FIGS. 5B and 6B, each of the lighting modules 500, 700 for the respective vehicular bumpers 600, 800 further include at least one light reflector 522; 728, 732 which may be disposed within an interior area 604, 804 of the respective vehicular bumper 600, 800 and adjacent to the inner surface 508, 712 of the respective transparent polymeric portion 506, 710 of each respective lighting module 500, 700. As shown in FIGS. 5B and 6B, at least the at least one light reflector 522; 728, 732 and the respective transparent polymeric portion 506, 710 together define at least one light chamber 526; 736, 738 for containing the at least one light source 502, 504; 702, 704, 706, 708 at least partially therein. The at least one light reflector 522; 728, 732 has a metallic reflecting surface 524; 730, 734 (e.g. a chrome or mirror-like surface finish capable of reflecting and distributing emitted light) thereon which is configured to be visible through the at least one etching 514, 516, 518; 718, 720, 722 in the chromium-based reflective coating 512, 716 coated on the respective outer surface 510, 714 of the respective transparent polymeric portion 506, 710. As such, in addition to being capable of reflecting and distributing light emitted by the at least one light source 502, 504; 702, 704, 706, 708, particularly within the at least one light chamber 526; 736, 738, since the metallic reflecting surface 524; 730, 734 on the at least one light reflector 522; 728, 732 is configured to be visible through the at least one etching 514, 516, 518; 718, 720, 722 in the chromium-based reflective coating 512, 716, the metallic reflecting surface 524; 730, 734 is advantageously capable of aesthetically blending and/or substantially concealing the visual appearance of the at least one etching 514, 516, 518; 718, 720, 722 relative to the surrounding chromium-based reflective coating 512, 716 in which the at least one etching 514, 516, 518; 718, 720 is etched. Additionally, as may be understood by one of ordinary skill, the at least one light reflector 522; 728, 732 may be shaped and/or sized in any suitable manner so as to effectively reflect and distribute light emitted by the at least one light source 502, 504; 702, 704, 706, 708, and is not limited to the examples schematically shown and described herein.

During operation, with the at least one light source 502, 504; 702, 704, 706, 708 electrically-connected to the vehicle, light emitted by the at least one light source 502, 504; 702, 704, 706, 708 is reflected and distributed by the at least one light reflector 522; 728, 732, substantially within the at least one light chamber 526; 736, 738 and towards the transparent polymeric portion 506, 710, so as to simultaneously pass through the chromium-based reflective coating 512, 716 coated on the outer surface 510, 714 of the transparent polymeric portion 506, 710 and the at least one etching 514, 516, 518; 718, 720, 722 in the chromium-based reflective coating 512, 716. In this manner, due to the at least one etching 514, 516, 518; 718, 720, 722 being substantially more permeable to the light emitted by the at least one light source 502, 504; 702, 704, 706, 708 than the surrounding chromium-based reflective coating 512, 716, as viewed from an environment surrounding the outer portion 602, 802 of the vehicular bumper 600, 800 (e.g. as schematically shown in FIGS. 5A and 6A), the light which passes through the at least one etching 514, 516, 518; 718, 720, 722 in the chromium-based reflective coating 512, 716 illuminates brighter than the light which passes through the surrounding chromium-based reflective coating 512, 716 coated on the outer surface 510, 714 of the transparent polymeric portion 506, 710. As such, multiple shades and/or intensities of light may be viewed as being simultaneously passed through the at least one etching 514, 516, 518; 718, 720, 722 in the chromium-based reflective coating 512, 716 and the surrounding chromium-based reflective coating 512, 716 in which the least one etching 514, 516, 518; 718, 720, 722 is etched. As a result, graphics, patterns, shaped outlines, indicia, etc. which may be formed by the least one etching 514, 516, 518; 718, 720, 722 appear to be lit brighter, and may therefore be visually highlighted with greater emphasis, than the surrounding chromium-based reflective coating 512, 716 which is simultaneously lit as light passes therethrough. Additionally, the at least one light source 502, 504; 702, 704, 706, 708, while at least unlit and emitting no light, is concealed behind the chromium-based reflective coating 512, 716 coated on the outer surface 510, 714 of the transparent polymeric portion 506, 710. Furthermore, as schematically shown in FIGS. 5B and 6B, the at least one light source 502, 504; 702, 704, 706, 708 is disposed away from the at least one etching 514, 516, 518; 718, 720, 722 in the chromium-based reflective coating 512, 716 such that the at least one light source 502, 504; 702, 704, 706, 708, whether unlit and emitting no light or lit and emitting light, is not directly visible through the at least one etching 514, 516, 518; 718, 720, 722 in the chromium-based reflective coating 512, 716. In this manner, the at least one light source 502, 504; 702, 704, 706, 708 being concealed behind the transparent polymeric portion 506, 710 and the chromium-based reflective coating 512, 716 coated on the outer surface 510, 714 of the transparent polymeric portion 506, 710 may advantageously provide benefits such as, but not limited to, a sleeker, more elegant design or appearance of the vehicular bumper 600, 800.

In the particular non-limiting example of the lighting module 500 for the vehicular bumper 600 schematically shown in FIGS. 5A and 5B, the at least one etching 514, 516, 518 in the chromium-based reflective coating 512 coated on the outer surface 510 of the transparent polymeric portion 506 comprises a first etching 514 disposed within a first boundary area 528 of the transparent polymeric portion 506, a second etching 516 disposed within a second boundary area 530 of the transparent polymeric portion 506, the second boundary area 530 disposed adjacent to the first boundary area 528, and a third etching 518 disposed within a third boundary area 532 of the transparent polymeric portion 506, the third boundary area 532 disposed adjacent to the second boundary area 530. Additionally, the at least one light source 502, 504 comprises a plurality of light sources 502, 504, the at least one light reflector 522 comprises a plurality of light reflectors 522 and the at least one light chamber 526 comprises a plurality of light chambers 526.

As FIG. 5B is a schematic diagram illustrating primarily an enlarged sectional end view of the vehicular bumper 600 schematically shown in FIG. 5A, further details regarding the first boundary area 528, the second boundary area 530, the third boundary area 532, the plurality of light sources 502, 504, the plurality of light reflectors 522 and the plurality of light chambers 526 will now be discussed for further clarity. In the example schematically shown in FIG. 5A, the first, second and third boundary areas 528, 530, 532 of the transparent polymeric portion 506 are each defined by respective areas of the transparent polymeric portion 506 defined between upper and lower edges of the transparent polymeric portion 506 and between respective longitudinal distances (i.e. measured along the end-to-end direction L1 of the vehicular bumper 600) corresponding to the respective upwardly-projecting dashed measurement lines shown in FIG. 5A. Additionally, while the plurality of light sources 502, 504 are schematically shown in FIG. 5B as being two light sources 502, 504, the plurality of light sources 502, 504 may comprise as many light sources 502, 504 that are suitable and/or desired to be employed in the lighting module 500, and may be distributed along the lighting module 500 in at least the end-to-end direction L1 of the vehicular bumper 600 (FIG. 5A), as may be understood by one of ordinary skill. Similarly, while the plurality of light reflectors 522 and the plurality of light chambers 526 are schematically shown in FIG. 5B as being an individual light reflector 522 and an individual light chamber 526, as many light reflectors 522 and light chambers 526 that are suitable and/or desired to be employed in the lighting module 500 may be distributed along the lighting module 500 in at least the end-to-end direction L1 of the vehicular bumper 600 (FIG. 5A), as may be understood by one of ordinary skill. As a non-limiting example, the lighting module 500 may further include a plurality of opaque light chamber dividers (not shown) which may be generally planar and may extend from the inner surface 508 of the transparent polymeric portion 506 so as to be substantially perpendicular to the inner surface 508 of the transparent polymeric portion 506. Each of the plurality of opaque light chamber dividers (not shown) may extend from the inner surface 508 of the transparent polymeric portion 506 and be positioned within the interior area 604 of the vehicular bumper 600 so as to correspond to the respective upwardly-projecting dashed measurement lines shown in FIG. 5A to physically divide each of the first, second and third boundary areas 528, 530, 532 of the transparent polymeric portion 506 from each other. Additionally, in this non-limiting example, each of the plurality of light reflectors 522 may be arranged in between the respective opaque light chamber dividers (not shown), and together with the opaque light chamber dividers and the transparent polymeric portion 506, may define the plurality of light chambers 526, which may be distributed along the lighting module 500 in at least the end-to-end direction L1 of the vehicular bumper 600 (FIG. 5A). Likewise, the plurality of light sources 502, 504 may be disposed at least partially within at least the plurality of light chambers 526 along the lighting module 500 in at least the end-to-end direction L1 of the vehicular bumper 600. In this manner, the light emitted by the plurality of light sources 502, 504, within each of the plurality of light chambers 526, may be separated and dedicated to the respective divided first, second and third boundary areas 528, 530, 532 of the transparent polymeric portion 506.

During operation, with the plurality of light sources 502, 504 electrically-connected to the vehicle: (i) light emitted by a first number (e.g. a first individual light source or a first group of light sources) of the plurality of light sources 502, 504 is a first color of light emitted in response to a vehicle turn signal light function being activated (e.g. by a driver's input), the first color of light being reflected and distributed by a first number (e.g. a first individual light reflector) of the plurality of light reflectors 522, substantially within a first number (e.g. a first individual light chamber) of the plurality of light chambers 526 and towards the transparent polymeric portion 506, so as to simultaneously pass through the chromium-based reflective coating 512 disposed within the first boundary area 528 of the transparent polymeric portion 506 and the first etching 514 in the chromium-based reflective coating 512 disposed within the first boundary area 528, (ii) light emitted by a second number (e.g. a second individual light source or a second group of light sources) of the plurality of light sources 502, 504 is a second color of light emitted in response to a vehicle daytime running light function being activated (e.g. by a control system of the vehicle), the second color of light being reflected and distributed by a second number (e.g. a second individual light reflector) of the plurality of light reflectors 522, substantially within a second number (e.g. a second individual light chamber) of the plurality of light chambers 526 and towards the transparent polymeric portion 506, so as to simultaneously pass through the chromium-based reflective coating 512 disposed within the second boundary area 530 of the transparent polymeric portion 506 and the second etching 516 in the chromium-based reflective coating 512 disposed within the second boundary area 530, and (iii) light emitted by a third number (e.g. a third individual light source or a third group of light sources) of the plurality of light sources 502, 504 is a third color of light emitted in response to another vehicle turn signal light function being activated (e.g. by the driver's input), the third color of light being reflected and distributed by a third number (e.g. a third individual light reflector) of the plurality of light reflectors 522, substantially within a third number (e.g. a third individual light chamber) of the plurality of light chambers 526 and towards the transparent polymeric portion 506, so as to simultaneously pass through the chromium-based reflective coating 512 disposed within the third boundary area 532 of the transparent polymeric portion 506 and the third etching 518 in the chromium-based reflective coating 512 disposed within the third boundary area 532. In this example, the first color of light is amber light, the second color of light is white light or amber light and the third color of light is amber light (which are often employed for vehicle turn signal light and vehicle daytime running light functions). However, as may be understood by one of ordinary skill, the plurality of light sources 502, 504 may emit any desired color or colors of light.

In the particular non-limiting example of the lighting module 700 for the vehicular bumper 800 schematically shown in FIGS. 6A and 6B, the at least one etching 718, 720, 722 in the chromium-based reflective coating 716 coated on the outer surface 714 of the transparent polymeric portion 710 comprises a first etching 718 disposed within a first subdivided area 746 of a first boundary area 740 of the transparent polymeric portion 710, the first etching 718 further disposed within a second boundary area 742 of the transparent polymeric portion 710, the second boundary area 742 disposed adjacent to the first boundary area 740, the first etching 718 further disposed within a first subdivided area 750 of a third boundary area 744 of the transparent polymeric portion 710, the third boundary area 744 disposed adjacent to the second boundary area 742, and the at least one etching 718, 720, 722 in the chromium-based reflective coating 716 further comprises a second etching 720 disposed within a second subdivided area 748 of the first boundary area 740 and a third etching 722 disposed within a second subdivided area 752 of the third boundary area 744. Additionally, the at least one light source 702, 704, 706, 708 comprises a plurality of light sources 702, 704, 706, 708, the at least one light reflector 728, 732 comprises a plurality of light reflectors 728, 732 and the at least one light chamber 736, 738 comprises a plurality of light chambers 736, 738.

As FIG. 6B is a schematic diagram illustrating primarily an enlarged sectional end view of the vehicular bumper 800 schematically shown in FIG. 6A, further details regarding the first boundary area 740, the first and second subdivided areas 746, 748 of the first boundary area 740, the second boundary area 742, the third boundary area 744, the first and second subdivided areas 750, 752 of the third boundary area 744, the plurality of light sources 702, 704, 706, 708, the plurality of light reflectors 728, 732 and the plurality of light chambers 736, 738 will now be discussed for further clarity. In the example schematically shown in FIG. 6A, the first, second and third boundary areas 740, 742, 744 of the transparent polymeric portion 710 are each defined by respective areas of the transparent polymeric portion 710 defined between upper and lower edges of the transparent polymeric portion 710 and between respective longitudinal distances (i.e. measured along the end-to-end direction L2 of the vehicular bumper 800) corresponding to the respective upwardly-projecting dashed measurement lines shown in FIG. 6A. Furthermore, the first subdivided area 746 of the first boundary area 740 is defined substantially by the lower half of the first boundary area 740 and the second subdivided area 748 of the first boundary area 740 is defined substantially by the upper half of the first boundary area 740. Similarly, the first subdivided area 750 of the third boundary area 744 is defined substantially by the lower half of the third boundary area 744 and the second subdivided area 752 of the third boundary area 744 is defined substantially by the upper half of the third boundary area 744. Additionally, while the plurality of light sources 702, 704, 706, 708 are schematically shown in FIG. 6B as being four light sources 702, 704, 706, 708, the plurality of light sources 702, 704, 706, 708 may comprise as many light sources 702, 704, 706, 708 that are suitable and/or desired to be employed in the lighting module 700, and may be distributed along the lighting module 700 in at least the end-to-end direction L2 of the vehicular bumper 800 (FIG. 6A), as may be understood by one of ordinary skill. Similarly, while the plurality of light reflectors 728, 732 and the plurality of light chambers 736, 738 are schematically shown in FIG. 6B as being two light reflectors 728, 732 and two light chambers 736, 738, as many light reflectors 728, 732 and light chambers 736, 738 that are suitable and/or desired to be employed in the lighting module 700 may be distributed along the lighting module 700 in at least the end-to-end direction L2 of the vehicular bumper 800 (FIG. 6A), as may be understood by one of ordinary skill. As schematically shown in FIG. 6B, as a non-limiting example, the lighting module 700 may further include one or more opaque horizontally-extending light chamber dividers 705, which may be a printed circuit board (PCB) 705 that carries multiple light sources thereon, such as light sources 704, 706. In this example, a plurality of horizontally-extending light chamber dividers 705 may be arranged in the interior area 804 of the vehicular bumper 800 so as to physically divide the first and second subdivided areas 746, 748 of the first boundary area 740 of the transparent polymeric portion 710 and the first and second subdivided areas 750, 752 of the third boundary area 744 of the transparent polymeric portion 710. Furthermore, in this example, the lighting module 700 may further include a plurality of vertically-extending opaque light chamber dividers (not shown) which may be generally planar and may extend from the inner surface 712 of the transparent polymeric portion 710 so as to be substantially perpendicular to the inner surface 712 of the transparent polymeric portion 710. In this example, each of the plurality of opaque light chamber dividers (not shown) may extend from the inner surface 712 of the transparent polymeric portion 710 and be respectively positioned within the interior area 804 of the vehicular bumper 800 so as to (i) perpendicularly abut or join with the plurality of horizontally-extending light chamber dividers 705 and (ii) correspond to the respective upwardly-projecting dashed measurement lines shown in FIG. 6A to further physically divide at least the second subdivided area 748 of the first boundary area 740 from the second boundary area 742 and further physically divide at least the second subdivided area 752 of the third boundary area 744 from the second boundary area 742. Additionally, in this non-limiting example, the plurality of light reflectors 728, 732 may be arranged in between at least the respective opaque light chamber dividers (not shown), and/or the respective horizontally-extending light chamber dividers 705, and together with the transparent polymeric portion 710, may define the plurality of light chambers 736, 738, which may be distributed along the lighting module 700 in at least the end-to-end direction L2 of the vehicular bumper 800 (FIG. 6A). Likewise, the plurality of light sources 702, 704, 706, 708 may be disposed at least partially within at least the plurality of respective light chambers 736, 738 along the lighting module 700 in at least the end-to-end direction L2 of the vehicular bumper 800. In this manner, the light emitted by the plurality of light sources 702, 704, 706, 708, within each of the plurality of respective light chambers 736, 738, may be separated and dedicated to the respective first subdivided area 746 of the first boundary area 740, the second boundary area 742, the first subdivided area 750 of the third boundary area 744, the second subdivided area 748 of the first boundary area 740 and the second subdivided area 752 of the third boundary area 744 of the transparent polymeric portion 710. Additionally, as schematically shown in FIG. 6B, one or more optional opaque light masks M may be included on the inner surface 712 of the transparent polymeric portion 710 to further define (e.g. increase, decrease or shape) areas of the transparent polymeric portion 710 which are to be permeable to light emitted by at least one of the plurality of light sources 702, 704, 706, 708.

During operation, with the plurality of light sources 702, 704, 706, 708 electrically-connected to the vehicle: (i) light emitted by a first number (e.g. a first individual light source or a first group of light sources) of the plurality of light sources 702, 704, 706, 708 is a first color of light emitted in response to a vehicle daytime running light function being activated (e.g. by a control system of the vehicle), the first color of light being reflected and distributed by a first number (e.g. a first individual light reflector) of the plurality of light reflectors 728, 732, substantially within a first number (e.g. a first individual light chamber) of the plurality of light chambers 736, 738 and towards the transparent polymeric portion 710, so as to simultaneously pass through the chromium-based reflective coating 716 disposed within the first subdivided area 746 of the first boundary area 740 of the transparent polymeric portion 710, the chromium-based reflective coating 716 disposed within the second boundary area 742 of the transparent polymeric portion 710, the chromium-based reflective coating 716 disposed within the first subdivided area 750 of the third boundary area 744 of the transparent polymeric portion 710, and the first etching 718 in the chromium-based reflective coating 716 disposed within the first subdivided area 746 of the first boundary area 740, the second boundary area 742 and the first subdivided area 750 of the third boundary area 744, (ii) light emitted by a second number (e.g. a second individual light source or a second group of light sources) of the plurality of light sources 702, 704, 706, 708 is a second color of light emitted in response to a vehicle turn signal light function being activated (e.g. by a driver's input), the second color of light being reflected and distributed by a second number (e.g. a second individual light reflector) of the plurality of light reflectors 728, 732, substantially within a second number (e.g. a second individual light chamber) of the plurality of light chambers 736, 738 and towards the transparent polymeric portion 710, so as to simultaneously pass through the chromium-based reflective coating 716 disposed within the second subdivided area 748 of the first boundary area 740 of the transparent polymeric portion 710 and the second etching 720 in the chromium-based reflective coating 716 disposed within the second subdivided area 748 of the first boundary area 740, and (iii) light emitted by a third number (e.g. a third individual light source or a third group of light sources) of the plurality of light sources 702, 704, 706, 708 is a third color of light emitted in response to another vehicle turn signal light function being activated (e.g. by the driver's input), the third color of light being reflected and distributed by a third number (e.g. a third individual light reflector) of the plurality of light reflectors 728, 732, substantially within a third number (e.g. a third individual light chamber) of the plurality of light chambers 736, 738 and towards the transparent polymeric portion 710, so as to simultaneously pass through the chromium-based reflective coating 716 disposed within the second subdivided area 752 of the third boundary area 744 of the transparent polymeric portion 710 and the third etching 722 in the chromium-based reflective coating 716 disposed within the second subdivided area 752 of the third boundary area 744. In this example, the first color of light is amber light or white light, the second color of light is amber light and the third color of light is amber light (which are often employed for vehicle turn signal light and vehicle daytime running light functions). However, as may be understood by one of ordinary skill, the plurality of light sources 702, 704, 706, 708 may emit any desired color or colors of light.

Regarding at least the above-described vehicular components, the transparent polymeric lenses 112, 308 of the respective headlamp assembly 100 and tail lamp assembly 300 and the transparent polymeric portions 506, 710 of the respective lighting modules 500, 700 for respective vehicular bumpers 600, 800 will now be further described. As a non-limiting example, the transparent polymeric lenses 112, 308 of the respective headlamp assembly 100 and tail lamp assembly 300 and the transparent polymeric portions 506, 710 of the respective lighting modules 500, 700 for respective vehicular bumpers 600, 800 may be formed from a polymeric material selected from the group consisting of polyacrylate, polyester, polystyrene, polyethylene, polypropylene, polyamides, polyimides, polycarbonate, epoxy, phenolic, acrylonitrile-butadiene-styrene, acrylonitrile-styrene-acrylates, acetal and blends thereof. Alternatively, as a non-limiting example, the transparent polymeric lenses 112, 308 of the respective headlamp assembly 100 and tail lamp assembly 300 and the transparent polymeric portions 506, 710 of the respective lighting modules 500, 700 for respective vehicular bumpers 600, 800 may be formed from a polymeric material selected from the group consisting of polycarbonate, poly(2,2'-dihydroxyphenylpropane) carbonate, poly diethylene glycol bis(allyl carbonate), polymethyl methacrylate, polystyrene and blends thereof. As a further non-limiting example, the transparent polymeric lenses 112, 308 of the respective headlamp assembly 100 and tail lamp assembly 300 and the transparent polymeric portions 506, 710 of the respective lighting modules 500, 700 for respective vehicular bumpers 600, 800 may be formed by a process such as injection molding and/or thermoforming. Additionally, the transparent polymeric lenses 112, 308 of the respective headlamp assembly 100 and tail lamp assembly 300 and the transparent polymeric portions 506, 710 of the respective lighting modules 500, 700 for respective vehicular bumpers 600, 800 may include a pre-coated film in the form of a hardcoat, a silicon hardcoat, an inorganic oxide, a thin metal film, or a combination of these pre-coated films.

Additionally, regarding at least the above-described vehicular components, the chromium-based reflective coating 118, 314 coated on the respective headlamp assembly 100 and tail lamp assembly 300 and the chromium-based reflective coating 512, 716 coated on the respective lighting modules 500, 700 for respective vehicular bumpers 600, 800 will now be further described. The chromium-based reflective coating 118, 314, 512, 716, which is configured to be at least partially permeable to at least some light, is disclosed in U.S. Pat. Nos. 9,656,601 B2; 9,181,616 B2; 9,176,256 B2; 9,819,343 B2, and United States Patent Application Publication Number US 2017/0267179 A1, each of which is hereby incorporated by reference in its entirety for all purposes. As a non-limiting example, the chromium-based reflective coating 118, 314, 512, 716 is an alloy of chromium and a dopant material. The dopant material may be selected from a group of hexagonally close-packed transition metals. The group of hexagonally close-packed transition metals may include at least one of zirconium, titanium, cobalt, hafnium, rubidium, yttrium and osmium. Alternatively, the group of hexagonally close-packed transition metals may include at least one of zirconium, titanium and cobalt. The alloy may have a crystal structure of a primary body-centered cubic phase in coexistence with a secondary omega hexagonally close-packed phase. The alloy may be a binary alloy of the chromium and the dopant material. An atomic percentage of the dopant material in the binary alloy may range from about 1.9 at. % to about 5.8 at. %. For example, the dopant material may be zirconium, and an atomic percentage of the zirconium in the binary alloy may range from about 4.5 at. % to about 5.8 at. %. Alternatively, the dopant material may be titanium, and an atomic percentage of the titanium in the binary alloy may range from about 1.9 at. % to about 5.8 at. %. Alternatively, the dopant material may be cobalt, and an atomic percentage of the cobalt in the binary alloy may range from about 1.9 at. % to 5.7 at. %. Additionally, as non-limiting examples, the chromium-based reflective coating 118, 314, 512, 716 may have a thickness of 200 nm or less, such as 200 nm, 100 nm, from 40 nm to 80 nm, from 50 nm to 70 nm, or about 60 nm. As such, as non-limiting examples, when coated on a polymeric substrate (e.g. the transparent polymeric lenses 112, 308 of the respective headlamp assembly 100 and tail lamp assembly 300 and/or the transparent polymeric portions 506, 710 of the respective lighting modules 500, 700 for respective vehicular bumpers 600, 800), the chromium-based reflective coating 118, 314, 512, 716 may be configured to be at least partially permeable to light such that about 6% to about 21% of the light emitted thereto (e.g. by light sources 104, 106 of the headlamp assembly 100; by light sources 304, 305 of the tail lamp assembly 300; by light sources 502, 504 of the lighting module 500 for vehicular bumper 600; or by light sources 702, 704, 706, 708 of the lighting module 700 for vehicular bumper 800) is permitted to pass therethrough. As such, depending on the desired brightness and/or intensity of the light which is to pass through at least the chromium-based reflective coating 118, 314, 512, 716, light sources (e.g. light sources 104, 106 of the headlamp assembly 100; light sources 304, 305 of the tail lamp assembly 300; light sources 502, 504 of the lighting module 500 for vehicular bumper 600; or light sources 702, 704, 706, 708 of the lighting module 700 for vehicular bumper 800) which have sufficient light output may ideally be selected and employed, as may be understood by one of ordinary skill.

The disclosed headlamp assembly 100 and tail lamp assembly 300, as shown and described herein, are therefore advantageously capable of emitting sufficient amounts of light to effectively perform their intended purpose, yet are capable of having an appearance which aesthetically harmonizes and/or merges with other surrounding vehicular components mounted to a vehicle, particularly vehicular components which have a metallic reflective coating coated thereon exhibiting a chrome or mirror-like surface finish.

Furthermore, the disclosed lighting modules 500, 700 for respective vehicular bumpers 600, 800, as shown and described herein, are advantageously capable of emitting sufficient amounts of light to effectively perform their intended purpose, yet are capable of providing substantially concealed lighting, especially while unlit and emitting no light, to provide a vehicle with a sleeker, more elegant appearance.

While one or more exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

The features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

LIST OF REFERENCE NUMERALS 100 exemplary headlamp assembly
102 housing of headlamp assembly
104 light source/daytime running light unit
106 light source/vehicle turn signal light unit
108 light source/high-beam light unit
110 light source/low-beam light unit
112 transparent polymeric lens
114 inner surface of transparent polymeric lens
116 outer surface of transparent polymeric lens
118 chromium-based reflective coating
120 first area having chromium-based reflective coating coated thereon
122 second area devoid of chromium-based reflective coating
200 exemplary vehicle
202 front portion of vehicle
204 metallic reflective coating, or the like coated on vehicular component
206 vehicular component mounted on front portion of vehicle
300 exemplary tail lamp assembly
302 housing of tail lamp assembly
304 light source/vehicle reverse light unit
305 light source/vehicle turn signal light unit
306 light source/vehicle tail and stop light unit
307 light source/vehicle tail and stop light unit
308 transparent polymeric lens
310 inner surface of transparent polymeric lens
312 outer surface of transparent polymeric lens
314 chromium-based reflective coating
316 first area having chromium-based reflective coating coated thereon 318 second area devoid of chromium-based reflective coating
400 another exemplary vehicle
402 rear portion of vehicle
404 metallic reflective coating, or the like coated on vehicular component
406 vehicular component mounted on rear portion of vehicle
500 exemplary lighting module for vehicular bumper
502 light source
504 light source
506 transparent polymeric portion
508 inner surface of transparent polymeric portion
510 outer surface of transparent polymeric portion
512 chromium-based reflective coating
514 first etching
516 second etching
518 third etching
520 etched gap
522 light reflector
524 metallic reflecting surface of light reflector
526 light chamber
528 first boundary area of transparent polymeric portion
530 second boundary area of transparent polymeric portion
532 third boundary area of transparent polymeric portion
600 exemplary vehicular bumper
602 outer portion of vehicular bumper
604 interior area of vehicular bumper
L1 end-to-end direction of vehicular bumper
700 another exemplary lighting module for vehicular bumper
702 light source
704 light source
705 horizontally-extending light chamber divider/printed circuit board (PCB)
706 light source
708 light source
710 transparent polymeric portion
712 inner surface of transparent polymeric portion
714 outer surface of transparent polymeric portion
716 chromium-based reflective coating
718 first etching
720 second etching
722 third etching
724 etched gap
726 etched gap
728 light reflector
730 metallic reflecting surface of light reflector
732 light reflector
734 metallic reflecting surface of light reflector
736 light chamber
738 light chamber
740 first boundary area of transparent polymeric portion
742 second boundary area of transparent polymeric portion
744 third boundary area of transparent polymeric portion
746 first subdivided area of first boundary area of transparent polymeric portion
748 second subdivided area of first boundary area of transparent polymeric portion
750 first subdivided area of third boundary area of transparent polymeric portion
752 second subdivided area of third boundary area of transparent polymeric portion
800 another exemplary vehicular bumper
802 outer portion of vehicular bumper
804 interior area of vehicular bumper
L2 end-to-end direction of vehicular bumper
M opaque light mask

Having thus described the disclosure, what is claimed is:

1. A lamp assembly configured to be mounted to a vehicle, the lamp assembly comprising:
   a housing configured to be coupled to a vehicle to mount the lamp assembly to the vehicle;
   at least one light source disposed at least partially within an interior of the housing, wherein the at least one light source is configured to be electrically-connected to the vehicle and emit light based on at least receiving electrical power from the vehicle; and
   a transparent polymeric lens coupled to the housing so as to substantially enclose the interior of the housing and the at least one light source, the transparent polymeric lens having an inner surface, an outer surface disposed opposite the inner surface and a chromium-based reflective coating coated on at least a first area of the outer surface, wherein with the at least one light source electrically-connected to the vehicle, the chromium-based reflective coating is at least partially permeable to at least some light which is emitted by the at least one light source and passed through the transparent polymeric lens, and wherein at least a second area of the outer surface of the transparent polymeric lens is devoid of the chromium-based reflective coating.

2. The lamp assembly according to claim 1, wherein a majority of the outer surface of the transparent polymeric lens is devoid of the chromium-based reflective coating.

3. The lamp assembly according to claim 1, wherein with the lamp assembly mounted to the vehicle, the chromium-based reflective coating coated on at least the first area of the outer surface of the transparent polymeric lens is positioned to aesthetically correspond to, and appear substantially merged with, a metallic reflective coating coated on at least a portion of at least one vehicular component mounted to the vehicle immediately adjacent to the lamp assembly.

4. The lamp assembly according to claim 3, wherein the at least one vehicular component mounted to the vehicle immediately adjacent to the lamp assembly is selected from the group consisting of an exterior trim piece, a front exterior trim piece, a front grill, a front bumper, a headlamp bezel, a rear exterior trim piece, a rear bumper and a tail lamp bezel.

5. The lamp assembly according to claim 1, wherein the at least one light source, while unlit and emitting no light, is concealed behind the chromium-based reflective coating coated on at least the first area of the outer surface of the transparent polymeric lens.

6. The lamp assembly according to claim 1, wherein the at least one light source comprises a plurality of light sources, wherein a first number of the plurality of light sources, while unlit and emitting no light, is concealed behind the chromium-based reflective coating coated on at least the first area of the outer surface of the transparent polymeric lens, and wherein a second number of the plurality of light sources, whether lit and emitting light or unlit and emitting no light, is visible through the transparent polymeric lens by way of at least the second area of the outer surface of the transparent polymeric lens which is devoid of the chromium-based reflective coating.

7. The lamp assembly according to claim 1, wherein the at least one light source comprises at least one of an incandescent light source, a light-emitting diode (LED) light source, or a combination of incandescent and light-emitting diode (LED) light sources.

8. The lamp assembly according to claim 1, wherein the lamp assembly is a headlamp assembly configured to be mounted to a front portion of the vehicle.

9. The lamp assembly according to claim 8, wherein with the headlamp assembly mounted to the front portion of the vehicle, the chromium-based reflective coating coated on at least the first area of the outer surface of the transparent polymeric lens is positioned to aesthetically correspond to, and appear substantially merged with, a metallic reflective coating coated on at least a portion of at least one vehicular component mounted to the vehicle immediately adjacent to the headlamp assembly.

10. The lamp assembly according to claim 9, wherein the at least one vehicular component mounted to the vehicle immediately adjacent to the headlamp assembly is selected from the group consisting of an exterior trim piece, a front exterior trim piece, a front grill, a front bumper and a headlamp bezel.

11. The lamp assembly according to claim 8, wherein the at least one light source comprises a plurality of light sources, wherein a first number of the plurality of light sources, while unlit and emitting no light, is concealed behind the chromium-based reflective coating coated on at least the first area of the outer surface of the transparent polymeric lens, and wherein a second number of the plurality of light sources, whether lit and emitting light or unlit and emitting no light, is visible through the transparent polymeric lens by way of at least the second area of the outer surface of the transparent polymeric lens which is devoid of the chromium-based reflective coating.

12. The lamp assembly according to claim 11, wherein the first number of the plurality of light sources comprises at least one of a daytime running light unit and a vehicle turn signal light unit, and wherein the second number of the plurality of light sources comprises at least one of a high-beam light unit and a low-beam light unit.

13. The lamp assembly according to claim 1, wherein the lamp assembly is a tail lamp assembly configured to be mounted to a rear portion of the vehicle.

14. The lamp assembly according to claim 13, wherein with the tail lamp assembly mounted to the rear portion of the vehicle, the chromium-based reflective coating coated on at least the first area of the outer surface of the transparent polymeric lens is positioned to aesthetically correspond to, and appear substantially merged with, a metallic reflective coating coated on at least a portion of at least one vehicular component mounted to the vehicle immediately adjacent to the tail lamp assembly.

15. The lamp assembly according to claim 14, wherein the at least one vehicular component mounted to the vehicle immediately adjacent to the tail lamp assembly is selected from the group consisting of an exterior trim piece, a rear exterior trim piece, a rear bumper and a tail lamp bezel.

16. The lamp assembly according to claim 13, wherein the at least one light source comprises a plurality of light sources, wherein a first number of the plurality of light sources, while unlit and emitting no light, is concealed behind the chromium-based reflective coating coated on at least the first area of the outer surface of the transparent polymeric lens, and wherein a second number of the plurality of light sources, whether lit and emitting light or unlit and emitting no light, is visible through the transparent polymeric lens by way of at least the second area of the outer surface of the transparent polymeric lens which is devoid of the chromium-based reflective coating.

17. The lamp assembly according to claim 16, wherein the first number of the plurality of light sources comprises at least one of a vehicle reverse light unit and a vehicle turn signal light unit, and wherein the second number of the plurality of light sources comprises at least one vehicle tail and stop light unit.

18. The lamp assembly according to claim 1, wherein the transparent polymeric lens is formed from a material selected from the group consisting of polyacrylate, polyester, polystyrene, polyethylene, polypropylene, polyamides, polyimides, polycarbonate, epoxy, phenolic, acrylonitrile-butadiene-styrene, acrylonitrile-styrene-acrylates, acetal and blends thereof.

19. The lamp assembly according to claim 1, wherein the transparent polymeric lens is formed from a material selected from the group consisting of polycarbonate, poly (2,2'-dihydroxyphenylpropane) carbonate, poly diethylene glycol bis(allyl carbonate), polymethyl methacrylate, polystyrene and blends thereof.

20. The lamp assembly according to claim 1, wherein the transparent polymeric lens includes a pre-coated film in the form of a hardcoat, a silicon hardcoat, an inorganic oxide, a thin metal film, or a combination of these pre-coated films.

21. The lamp assembly according to claim 1, wherein the chromium-based reflective coating is an alloy of chromium and a dopant material, the dopant material being selected from a group of hexagonally close-packed transition metals, the alloy having a crystal structure of a primary body-centered cubic phase in coexistence with a secondary omega hexagonally close-packed phase.

22. The lamp assembly according to claim 21, wherein the alloy is a binary alloy of the chromium and the dopant material.

23. The lamp assembly according to claim 22, wherein an atomic percentage of the dopant material in the binary alloy ranges from about 1.9 at. % to about 5.8 at. %.

24. The lamp assembly according to claim 21, wherein the group of hexagonally close-packed transition metals includes at least one of zirconium, titanium, cobalt, hafnium, rubidium, yttrium and osmium.

25. The lamp assembly according to claim 21, wherein the alloy is a binary alloy and the dopant material is zirconium, and wherein an atomic percentage of the zirconium in the binary alloy ranges from about 4.5 at. % to about 5.8 at. %.

26. The lamp assembly according to claim 21, wherein the alloy is a binary alloy and the dopant material is titanium, and wherein an atomic percentage of the titanium in the binary alloy ranges from about 1.9 at. % to about 5.8 at. %.

27. The lamp assembly according to claim 21, wherein the alloy is a binary alloy and the dopant material is cobalt, and wherein an atomic percentage of the cobalt in the binary alloy ranges from about 1.9 at. % to 5.7 at. %.

28. The lamp assembly according to claim 1, wherein the chromium-based reflective coating has a thickness of 200 nm or less.

29. The lamp assembly according to claim 1, wherein the chromium-based reflective coating has a thickness of 200 nm, 100 nm, from 40 nm to 80 nm, from 50 nm to 70 nm, or about 60 nm.

* * * * *

UNITED STATES PATENT AND TRADEMARK OFFICE
CERTIFICATE OF CORRECTION

PATENT NO. : 10,443,808 B1  
APPLICATION NO. : 16/378533  
DATED : October 15, 2019  
INVENTOR(S) : Heib et al.

Page 1 of 1

It is certified that error appears in the above-identified patent and that said Letters Patent is hereby corrected as shown below:

On the Title Page

Item (72) Inventor is corrected to read:
-- Sascha Bjorn Heib, Morphett Vale (AU);
Simon David Field, Flagstaff Hill (AU);
Andreas Herrmann, Geneva (CH). --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*